(12) United States Patent
Harada et al.

(10) Patent No.: US 8,018,413 B2
(45) Date of Patent: Sep. 13, 2011

(54) DRIVING APPARATUS FOR PHOTO-ADDRESSING TYPE DISPLAY ELEMENT, DRIVING METHOD AND PHOTO-ADDRESSING TYPE DISPLAY APPARATUS

(75) Inventors: Haruo Harada, Kanagawa (JP); Hiroshi Arisawa, Kanagawa (JP); Yasuhiro Yamaguchi, Kanagawa (JP); Tomozumi Uesaka, Kanagawa (JP); Tsutomu Ishii, Kanagawa (JP); Masahiro Sato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 975 days.

(21) Appl. No.: 11/905,715

(22) Filed: Oct. 3, 2007

(65) Prior Publication Data
US 2008/0180583 A1    Jul. 31, 2008

(30) Foreign Application Priority Data
Jan. 29, 2007    (JP) .................................. 2007-017297

(51) Int. Cl.
*G09G 3/34*    (2006.01)
(52) U.S. Cl. .............................. 345/87; 345/89; 345/204
(58) Field of Classification Search .................... 345/87, 345/89, 204
See application file for complete search history.

(56) References Cited

U.S. PATENT DOCUMENTS

| 4,435,047 | A |   | 3/1984 | Fergason |
| 5,856,814 | A | * | 1/1999 | Yagyu ............................... 345/89 |
| 6,040,880 | A | * | 3/2000 | Tsuboi et al. ...................... 349/5 |
| 6,067,135 | A |   | 5/2000 | Shimizu et al. |

FOREIGN PATENT DOCUMENTS

| JP | B2-07-009512 | 2/1995 |
| JP | A-09-197431 | 7/1997 |
| JP | A-09-236791 | 9/1997 |
| JP | A-11-237644 | 8/1999 |
| JP | B2-3178530 | 6/2001 |

* cited by examiner

*Primary Examiner* — Richard Hjerpe
*Assistant Examiner* — Leonid Shapiro
(74) *Attorney, Agent, or Firm* — Oliff & Berridge, PLC

(57) ABSTRACT

A driving apparatus includes a voltage applying unit, a light irradiation unit and a resistance control unit. The voltage applying unit forms a voltage applying circuit together with a pair of electrode layers of a photo-addressing type display element. The voltage applying unit applies a voltage between the pair of electrode layers. The light irradiation unit irradiates the photo-addressing type display element with addressing light. The resistance control unit controls a resistance to a current which flows in a direction to reduce a potential difference between the pair of electrode layers to be larger than that during a period in which the voltage applying unit is applying the voltage.

3 Claims, 21 Drawing Sheets

PLANAR

FOCAL CONIC

HOMEOTROPIC

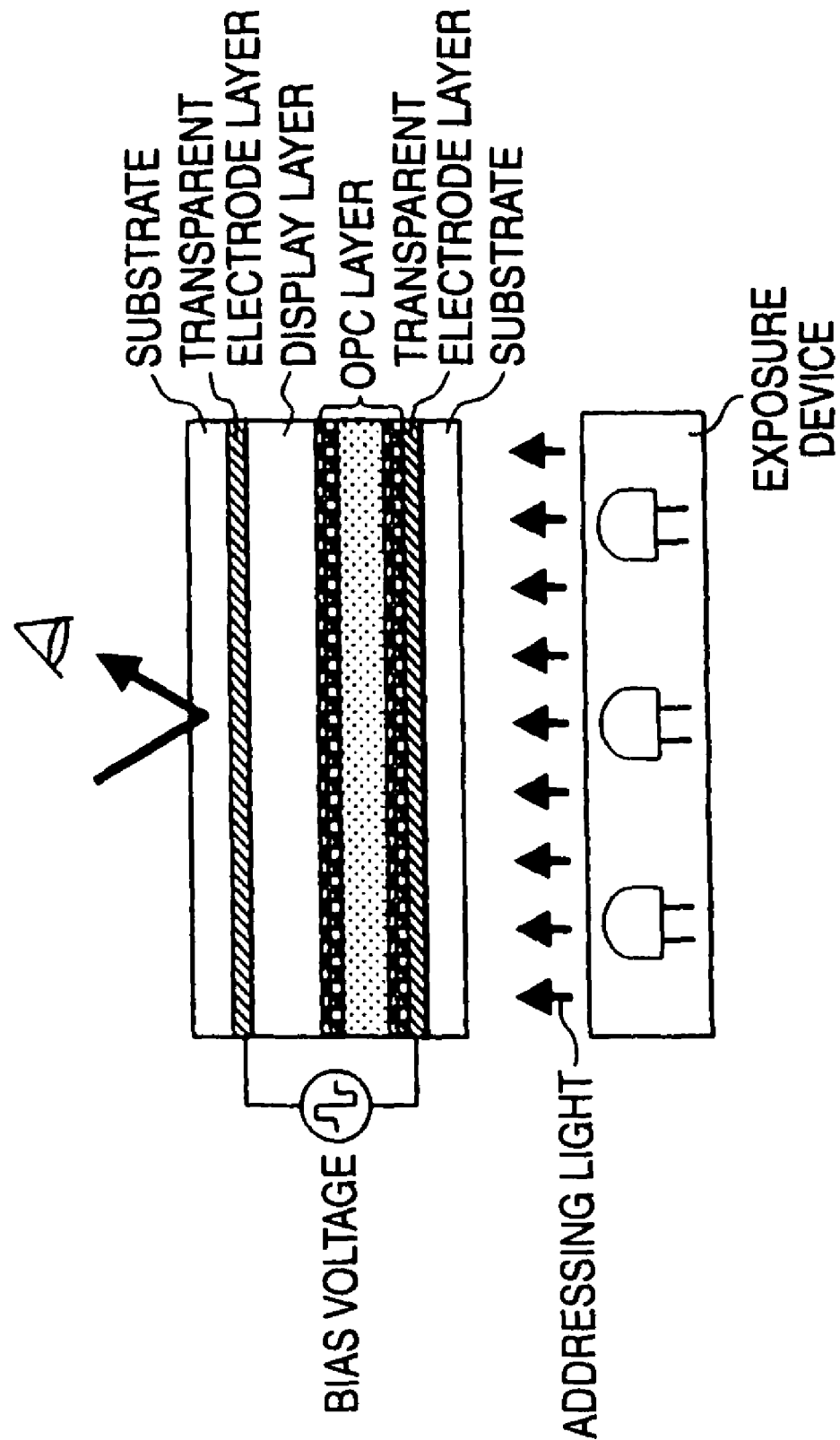

US 8,018,413 B2

DRIVING APPARATUS FOR PHOTO-ADDRESSING TYPE DISPLAY ELEMENT, DRIVING METHOD AND PHOTO-ADDRESSING TYPE DISPLAY APPARATUS

CROSS-REFERENCE TO RELATED APPLICATIONS

This application is based on and claims priority under 35 U.S.C. §119 from Japanese Patent Application No. 2007-17297 filed Jan. 29, 2007.

BACKGROUND

1. Technical Field

The invention relates to a driving apparatus for a photo-addressing type display element, a driving method and the photo-addressing type display element.

2. Related Art

Various rewritable marking arts high in convenience are researched. As one direction, in recent years, attention has been focused on a display element using cholesteric liquid crystal because it has the features of having a memory property capable of retaining display with no power supply, providing bright display because of using no polarizing plate, being capable of producing color display without using any color filter, and the like.

A planar texture indicated by cholesteric liquid crystal (chiral nematic liquid crystal) causes a selective reflection phenomenon to occur in which light incident in parallel with a screw axis is separated into right optical rotation and left optical rotation, the circular polarization component matching the twist direction of the spiral is Bragg-reflected, and the remaining light is allowed to pass through. Letting the helical pitch be p, average refractive index be in the plane orthogonal to the screw axis be n, and complex refractive index be Δn, center wavelength λ of reflected light and reflection wavelength width Δλ are represented as λ=n·p and Δλ=Δn·p respectively and reflected light based on the cholesteric liquid crystal in the planar texture produces vivid color dependent on the helical pitch.

The cholesteric liquid crystal having positive dielectric constant anisotropy shows three states of a planar texture in which the screw axis becomes perpendicular to the cell surface and the above-mentioned selective reflection phenomenon is caused to occur for incident light as shown in FIG. 20(A), a focal conic texture in which the screw axis becomes almost parallel to the cell surface and incident light is allowed to pass through while it is a little dispersed forward as shown in FIG. 20(B), and a homeotropic texture in which the spiral structure comes loose and liquid crystal director is oriented in the electric field direction for allowing incident light to pass through almost completely as shown in FIG. 20(C).

Of these three states, the planar texture and the focal conic texture can exist bistably in no electric field. Therefore, the phase state of the cholesteric liquid crystal is not uniquely determined with respect to the electric field strength applied to a liquid crystal layer and if planar texture is the initial state, the state changes in the order of the planar texture, the focal conic texture, and the homeotropic texture with an increase in the electric field strength; if focal conic texture is the initial state, the state changes in the order of the focal conic texture and the homeotropic texture with an increase in the electric field strength.

On the other hand, if the electric field strength applied to the liquid crystal layer is set to zero suddenly, the planar texture and the focal conic texture maintain the state intact and the homeotropic texture changes to the planar texture.

Therefore, the cholesteric liquid crystal layer just after a pulse signal is applied shows a switching behavior as shown in FIG. 21 and when the voltage of the applied pulse signal is Vfh or more, the selective reflection state in which the homeotropic texture changes to the planar texture is entered; when the voltage is between Vpf and Vfh, the transmission state based on the focal conic texture is entered; and when the voltage is Vpf or less, the state in which the state before the pulse signal is applied is continued, namely, the selective reflection state based on the planar texture or the transmission state based on the focal conic texture is entered.

In FIG. 21, the vertical axis is normalized light reflectivity; the light reflectivity is normalized with the maximum light reflectivity set to 100 and the minimum light reflectivity set to 0. Since a transition region exists among the states of the planar texture, the focal conic texture, and the homeotropic texture, the case where the normalized light reflectivity is 50 or more is defined as selective reflection state and the case where the normalized light reflectivity is less than 50 is defined as transmission state and the threshold voltage of texture change of the planar texture and the focal conic texture is Vpf and the threshold voltage of texture change of the focal conic texture and the homeotropic texture is Vfh.

FIG. 22 is a schematic drawing to schematically show a state where an image is written to a display element with an exposure device. As shown in FIG. 22, the display element is provided by depositing a display layer of a liquid crystal layer and an organic photosensitive layer of a photoconductive layer between a pair of transparent electrodes (sandwiching a shading layer (not shown) as required) and sandwiching them between a pair of substrates. The surface on the side of the organic photosensitive layer is exposed to light by the exposure device like an image in a state where a predetermined bias voltage is applied to both the transparent electrodes, whereby any desired record image can be written.

This display element can form a full-color image if units each sandwiching the display layer and the photoconductive layer between the electrode layers are deposited as three colors of R, G, and B.

SUMMARY

According to an aspect of the invention, a driving apparatus for a photo-addressing type display element includes a voltage applying unit, a light irradiation unit and a resistance control unit. The photo-addressing type display element includes a pair of electrode layers, a photoconductive layer and a light modulation layer. The electrode layer on a display side is transparent. The photoconductive layer is disposed between the pair of electrode layers. The photoconductive layer absorbs light in a certain wavelength region. An electric characteristic of the photoconductive layer changes in accordance with an amount of light absorbed. The light modulation layer is disposed between the pair of electrode layers. The light modulation layer forms a display image which allows light to pass therethrough or reflects the light. The voltage applying unit forms a voltage applying circuit together with the pair of electrode layers. The voltage applying unit applies a voltage between the pair of electrode layers. The light irradiation unit irradiates the photo-addressing type display element with addressing light from the display side or a rear side of the photo-addressing type display element. The resistance control unit controls a resistance. The resistance includes a resistance to a current, which flows in a direction to reduce a potential difference between the pair of electrode layers, of a current flowing between the photo-addressing type display element and the voltage applying unit in the voltage applying circuit. The resistance control unit controls the resistance so that the resistance when the voltage applying unit stops applying the voltage is larger than the resistance during a period in which the voltage applying unit applies the voltage between the pair of electrode layers.

BRIEF DESCRIPTION OF THE DRAWINGS

Exemplary embodiments of the invention will be described in detail below with reference to the accompanying drawings, wherein:

FIG. 22 is a schematic drawing to schematically show a state in which an image is written to a general display element with a light irradiation device.

DETAILED DESCRIPTION

A drive and a driving method of a photo-addressing type display element and a photo-addressing type display apparatus according to the exemplary embodiments will be described in detail.

The photo-addressing type display apparatus of the exemplary embodiments (which may be hereinafter referred to simply as a "display of the exemplary embodiment") is provided by combining the driving apparatus for the photo-addressing type display element according to the exemplary embodiments (which may be hereinafter referred to simply as a "driving apparatus of the exemplary embodiment") and the photo-addressing type display element to which an image is to be written by the driving apparatus. To operate the display of the exemplary embodiment, the driving method for the photo-addressing type display element according to the exemplary embodiments (which may be hereinafter referred to simply as a "driving method of the exemplary embodiment") is used.

Therefore, hereinafter, the display of the exemplary embodiments and the operation thereof will be described, whereby the driving apparatus, the driving method, and the display of the exemplary embodiments will be described comprehensively.

Figure 1:
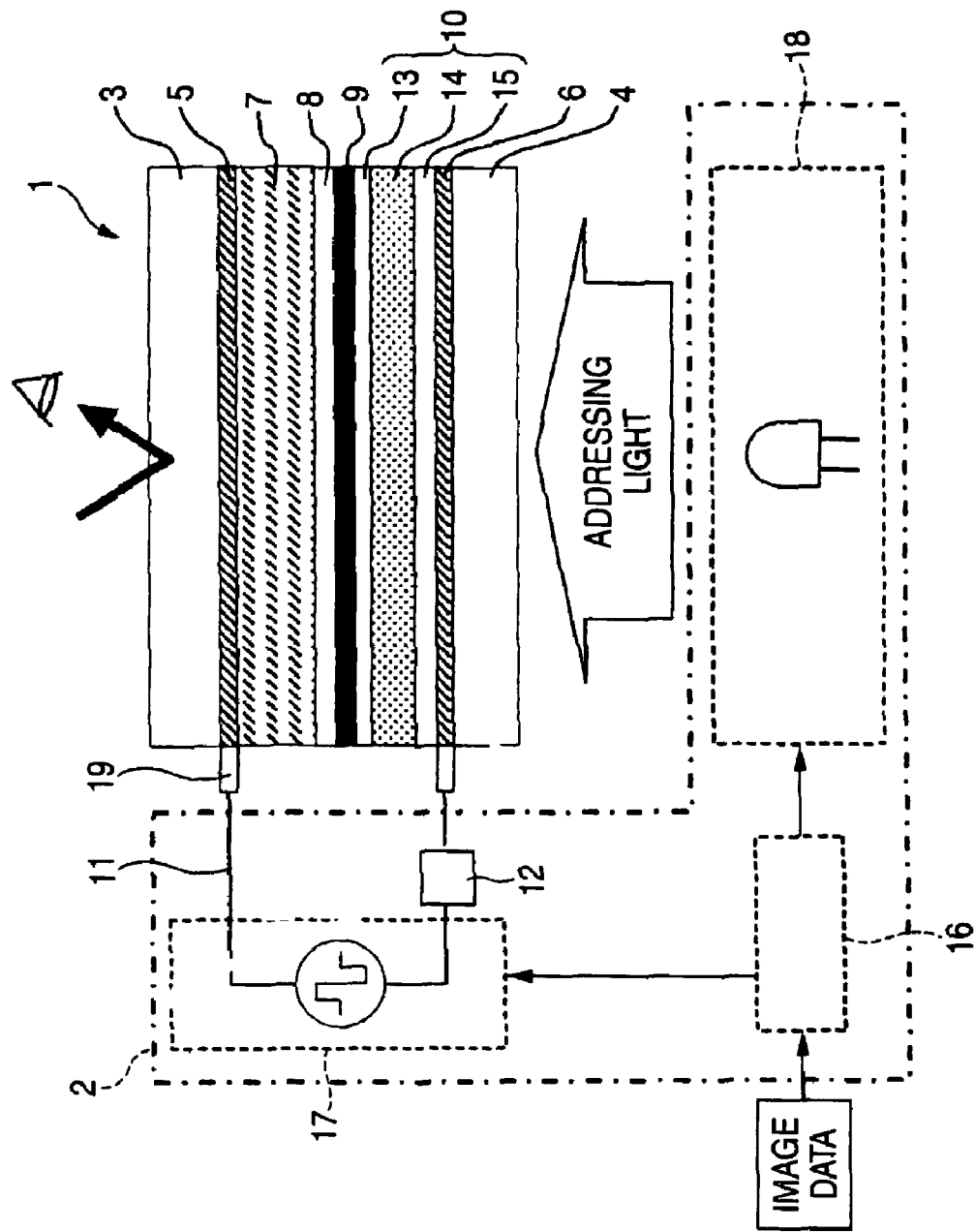
FIG. 1 is a schematic configuration drawing to show a photo-addressing type display apparatus according an exemplary embodiment of the invention.

FIG. 1 is a schematic configuration drawing to show the photo-addressing type display apparatus of an exemplary embodiment. As shown in FIG. 1, the display of the exemplary embodiment includes a photo-addressing type display element 1 and a driving apparatus (photo-addressing type driving apparatus) 2 for driving the display element (for writing an image). The driving apparatus 2 includes a power unit (voltage applying unit) 17, a light irradiation device (light irradiation unit) 18, a controller (resistance control unit) 12, and a control circuit 16 for controlling the operation of the components.

<Photo-Addressing Type Display Element>

In the exemplary embodiment, the display element (photo-addressing type display element) 1 has a substrate 3, an electrode 5, a light modulation layer 7, a laminate layer 8, a colored layer (shading layer) 9, an organic photosensitive layer (photoconductive layer) 10, an electrode (electrode layer) 6, and a substrate 4 deposited in order from the display surface.

(Substrate)

The substrates 3 and 4 are members intended for holding the functional layers inside and maintaining the structure of the display element. Each of the substrates 3 and 4 is a sheet-shaped substance having a strength enduring an external force and may have flexibility. As a specific material, an inorganic sheet (for example, glass, silicon), a polymer film (for example, polyethylene terephthalate, polysulfone, polyethersulfone, polycarbonate, polyethylene naphthalate), etc., can be named. At least, the substrate 3 on the display surface side has a function of transmitting display light. It may be formed on an outer surface with a known functional film of a dirt prevention film, a wear resistance film, a light reflection prevention film, a gas barrier film, etc.

(Electrode)

The electrodes (electrode layers) 5 and 6 are members intended for applying a bias voltage applied from the power unit 17 to the functional layers in the display element 1. Specifically, a conductive thin film formed of metal (for example, gold, silver, copper, iron, aluminum), a metal oxide (for example, indium oxide, tin oxide, indium tin oxide (ITO)), carbon, a complex having them dispersed in a polymer, a conductive organic polymer (for example, polythiophen base, polyaniline base), etc., can be named. It may be formed on a surface with a known functional film of an adhesion improvement film, a light reflection prevention film, a gas barrier film, etc.

(Light Modulation Layer)

In the exemplary embodiment, the light modulation layer is not limited so long as it has a function of modulating the reflection or transmission state of incident light depending on an electric field and has property of being capable of holding the selection state in no electric field. For example, if orientation change of liquid crystal is used, various liquid crystal elements different in optical effect can be used such as a liquid crystal element using change in the polarization state such as bistable twist nematic liquid crystal or surface stabilized ferroelectric liquid crystal, a liquid crystal element using change in the light scattering state such as memory-property polymer dispersed liquid crystal, a liquid crystal element using change in the light absorption state such as guest host liquid crystal with a dichromatic pigment mixed with them, and a liquid crystal element using change in the light interference state such as memory-property cholesteric (chiral nematic) liquid crystal. In the exemplary embodiment, the liquid crystal element last mentioned is illustrated. A structure which does not become deformed against an external force of bend, pressure, etc., is preferred as the light modulation layer.

In the exemplary embodiment, a liquid crystal layer of a self-holding type liquid crystal complex made up of cholesteric liquid crystal and a transparent resin is formed as the light modulation layer. That is, it is a liquid crystal layer not requiring a spacer, etc., because it has a self-hold property as a complex. In the exemplary embodiment, cholesteric liquid crystal is dispersed in a polymer matrix (transparent resin) although not shown in the figure.

In the exemplary embodiment, the light modulation layer need not necessarily be a liquid crystal layer of a self-holding type liquid crystal complex and may be formed of liquid crystal only, of course.

The cholesteric liquid crystal has a function of modulating the reflection or transmission state of specific color light in incident light and has liquid crystal molecules oriented as helically twisted for executing interference reflection of specific light dependent on the helical pitch, of light incident from the screw axis direction. The orientation changes according to an electric field and the reflection state can be changed. To form the light modulation layer of a self-holding type liquid crystal complex, preferably it is placed as a monolayer densely with uniform drop sizes.

As specific liquid crystal that can be used as cholesteric liquid crystal, a steroid base cholesterol derivative or nematic liquid crystal or smectic liquid crystal (for example, Schiff base, azo base, azoxy base, benzoate base, biphenyl base, terphenyl base, cyclohexyl carboxylate base, phenyl cyclohexane base, biphenyl cyclohexane base, pyrimidine base, dioxane base, cyclohexyl cyclohexane ester base, cyclohexyl ethane base, cyclohexane base, tran base, alkenyl base, stilbene base, polycyclic base) or substance provided by adding to a mixture thereof, a chiral agent (for example, steroid base cholesterol derivative, Schiff base, azo base, ester base, biphenyl base), and the like can be named.

The helical pitch of the cholesteric liquid crystal is adjusted according to the chemical structure of a liquid crystal molecule and the addition amount of a chiral agent to the nematic liquid crystal. For example, to set the display color to blue, green, or red, the center wavelength of selective reflection is placed in the range of 400 nm to 500 nm, the range of 500 nm to 600 nm, or the range of 600 nm to 700 nm. To compensate for the temperature dependency of the helical pitch of the cholesteric liquid crystal, a known technique of adding a plurality of chiral agents different in twist direction or showing inverse temperature dependency may be used.

As a form wherein the light modulation layer 7 forms a self-holding type liquid crystal complex made up of cholesteric liquid crystal and a polymer matrix (transparent resin), a PNLC (Polymer Network Liquid Crystal) structure wherein network resin is contained in the continuous phase of the cholesteric liquid crystal or a PDLC (Polymer Dispersed Liquid Crystal) structure wherein the cholesteric liquid crystal is dispersed like droplets in the skeleton of the polymer (containing a polymer dispersed microencapsulated liquid crystal structure) can be used and the PNLC structure or the PDLC structure is adopted, whereby an anchoring effect is produced on the interface between the cholesteric liquid crystal and the polymer and the hold state of the planar texture or the focal conic texture in no electric field can be more stabilized.

The PNLC structure and the PDLC structure can be formed according to a known method of executing phase separation of polymer and liquid crystal, for example, a PIPS (Polymerization Induced Phase Separation) method of mixing a polymer precursor polymerized by heat, light, an electron ray, etc., such as acrylic base, thiol base, or epoxy base, and liquid crystal and polymerizing from the state of a uniform phase for phase separation, an emulsion method of mixing a polymer low in liquid crystal solubility such as polyvinyl alcohol and liquid crystal and executing agitation suspension for dispersing the liquid crystal in the polymer like droplets, a TIPS (Thermally Induced Phase Separation) method of mixing a thermoplastic polymer and liquid crystal and cooling from a heated state to a uniform phase for phase separation, an SIPS (Solvent Induced Phase Separation) method of dissolving a polymer and liquid crystal in a solvent of chloroform, etc., and evaporating the solvent for phase separation of the polymer and the liquid crystal, or the like, but the method is not limited.

The polymer matrix has a function of holding cholesteric liquid crystal and suppressing fluid flow of liquid crystal (image change) caused by deformation of a display element, and a polymer material not dissolving in liquid crystal material and with liquid not mutually solved in liquid crystal as a solvent is used preferably. It is desirable that a material having a strength enduring an external force and showing high transmission at least for reflected light and addressing light should be used as the polymer matrix.

As the material that can be adopted as the polymer matrix, a water-soluble polymer material (for example, gelatin, polyvinyl alcohol, cellulose derivative, polyacrylic polymer, ethyleneimine, polyethylene oxide, polyacrylamide, polystyrene sulfonate, polyamidine, isoprene base sulfonic acid polymer) or a material that can be put into water-based emulsion (for example, fluorocarbon resin, silicone resin, acrylic resin, urethane resin, epoxy resin), etc., can be named.

(Organic Photosensitive Layer)

The organic photosensitive layer (photoconductive layer) 10 is a layer having an internal photoelectric effect and having a characteristic of the impedance characteristic changing in response to the irradiation strength of addressing light. To perform alternating current (AC) operation, it is desirable that symmetrical drive relative to addressing light should be performed, and the organic photosensitive layer 10 is formed as a three-layer structure in which a charge generation layer (CGL) is deposited above and below a charge transport layer (CTL). In the exemplary embodiment, as the organic photosensitive layer 10, an upper charge generation layer 13, a charge transport layer 14, and a lower generation charge generation layer 15 are deposited in order from the top layer in FIG. 1.

Each of the charge generation layers 13 and 15 is a layer having a function of absorbing addressing light and generating a light carrier. Mainly, the charge generation layer 13 has an effect on the light carrier amount flowing in the direction of the electrode 6 on the write surface side from the electrode 5 on the display surface side, and the charge generation layer 15 has an effect on the light carrier amount flowing in the direction of the electrode 5 on the display surface side from the electrode 6 on the write surface side. Preferably, the charge generation layer 13, 15 is a layer capable of absorbing addressing light, generating an excitor, and efficiently separating to a free carrier in CGL or on the interface between CGL and CTL.

Each of the charge generation layers 13 and 15 can be formed according to a dry method of directly forming a film of a charge generation material (for example, metal or nonmetal phthalocyanine, squalium compound, azulenium compound, perylene pigment, indigoid pigment, azo pigment of bis, tris, etc., quinacridone pigment, pyrrolo pyrrole dye, polycyclic quinone pigment, reduced cyclic aromatic series pigment such as dibromo anth anthrone, cyanine dye, xanthene pigment, charge transfer complex of polyvinyl carbazole and nitro fluorine, etc., eutectoid complex made up of pyrylium salt dye and polycarbonate resin) or a wet applying method of preparing application liquid by dispersing or dissolving the charge generation materials in a proper solvent together with a polymer binder (for example, polyvinyl butyral resin, polyallylate resin, polyester resin, phenol resin, vinyl carbazole resin, vinyl formal resin, partial denaturation vinyl acetal resin, carbonate resin, acrylic resin, vinyl chloride resin, styrene resin, vinyl acetate resin, vinyl acetate resin, silicone resin, etc.), applying the liquid, and drying it to form a film or the like.

The charge transport layer 14 is a layer into which the light carrier generated in the charge generation layer 13, 15 is poured, and has a function of drifting in an electric field direction applied with a bias signal.

Preferably, in the charge transport layer 14, pouring of free carrier from the charge generation layer 13, 15 occurs efficiently (preferably the charge transport layer 14 has an ionization potential close to that of the charge generation layer 13, 15) and the poured free carrier makes a hopping move at high speed as much as possible. To increase the impedance at the dark time, preferably dark current based on heat carrier is lower.

The charge transport layer 14 may be formed by preparing a substance by dispersing or dissolving a low-molecular hole transport material (for example, trinitro fluorine base compound, polyvinyl carbazole base compound, oxadiazole base compound, hydrazone base compound such as benzylamino base hydrazone or quinoline base hydrazone, stilbene base compound, triphenyl amine base compound, triphenyl methane base compound, benzidine base compound) or low-molecular electron transport material (for example, quinone base compound, tetra cyano kino dimetan base compound, flu fleuron compound, xanthone base compound, benzophenone base compound) in a proper solvent together with a polymer binder (for example, polycarbonate resin, polyallylate resin, polyester resin, polyimide resin, polyamide resin, polystyrene resin, silicon-containing crosslink type resin, etc.,) or a substance by dispersing or dissolving a material provided by the above-mentioned hole transport material or electron transport material put into a polymer in a proper solvent, applying the substance, and drying it.

(Colored Layer)

The colored layer (shading layer) 9 is a layer provided for the purposes of optically separating addressing light and incident light at the writing time for preventing malfunction caused by mutual interference and optically separating external light incident from the non-display surface side of a display element and a display image at the display time for preventing degradation of the image quality; it is not an indispensable component in the invention. However, it is a layer to be provided for improving performance of the display element 1. From the purposes, a function of absorbing at least light in the absorption wave range of the charge generation layer and light in the reflected wave range of the light modulation layer is required for the colored layer 9.

The colored layer 9 specifically can be formed according to a wet applying method of preparing application liquid by dispersing or dissolving inorganic pigment (for example, cadmium base, chromium base, cobalt base, manganese base, caron base) or organic dye or organic pigment (for example, azo base, anthraquinone base, indigo base, triphenylmethane base, nitro base, phthalocyanine base, perylene base, pyrrolo pyrrole base, quinacridone base, polycyclic quinone base, squarerium base, azurenium base, cyanine base, pyririum base, anthrone base) in a proper solvent together with a polymer binder (for example, polyvinyl alcohol resin, polyacrylic resin, etc.), applying the liquid, and drying it to form a film or the like.

(Laminate Layer)

The laminate layer 8 is provided for the purpose of playing a role in absorbing asperities and adhering when the functional layers formed inside the upper and lower substrates 3 and 4 are put on each other; it is not an indispensable component in the invention. The laminate layer 8 is formed of a thermoplastic organic material, a thermosetting organic material, or an organic material of mixed type thereof, and a material capable of causing the light modulation layer 7 and the colored layer 9 closely adhering or adhering to each other by heat and pressure is selected. It needs to have at least a transmission property of incident light.

As an appropriate material for the laminate layer 8, an adhesive polymeric material (for example, polyethylene base, polypropylene base, polyurethane base, epoxy base, acrylic base, rubber base, silicone base) can be named.

(Contact Terminal)

A contact terminal 19 is a member for bringing a conductive wire 11 to which a voltage is supplied from the power unit 17 (containing the case where voltage is supplied through the controller 12) and the display element 1 (electrode 5, 6) into conduction, and a material having high electric conductivity and having small contact resistance with the electrode 5, 6 and the conductive wire 11 is selected. Preferably, it is of a structure that can be detached from the electrode layer 5, 6 as shown in the figure (instead or in addition, that can be detached from the driving apparatus 2) so that the display element 1 and the driving apparatus 2 can be separated.

A voltage applying circuit is formed among the electrodes 5 and 6 of the display element 1, the power unit 17, and the controller 12 through the contact terminal 19.

As the contact terminal 19, a terminal made of metal (for example, gold, silver, copper, iron, aluminum), carbon, a complex having them dispersed in a polymer, a metal oxide (for example, indium oxide, tin oxide, indium tin oxide (ITO)), carbon, a complex having them dispersed in a polymer, a conductive organic polymer (for example, polythiophen base, polyaniline base), etc., and having a clip connector shape for clipping the electrode can be named.

<Photo-Addressing Type Driving Apparatus>

In the exemplary embodiment, the driving apparatus (photo-addressing type driving apparatus) 2 is a device for writing an image to the display element 1 and has the light irradiation device (light irradiation unit) 18 for irradiating the display element 1 with addressing light, the power unit (voltage applying unit) 17 for applying a bias voltage to the display element 1, and the controller (resistance control unit) 12 as main components and further includes the control circuit 16 for controlling the operation of the components.

(Light Irradiation Device)

The light irradiation device (light irradiation unit) 18 is not limited if it has a function of irradiating the display element 1 with a predetermined addressing light pattern as an image and can irradiate the display element 1 (particularly, the organic photosensitive layer 10) with any desired light image pattern (spectrum, strength, spatial frequency) based on an input signal from the control section 16. The area to be irradiated with light need not be the full face of the write face of the display element 1 and may be within the range in which the light modulation layer is formed, of course, and needs only to be in the write area.

The addressing light irradiated by the light irradiation device 18 satisfying the following conditions is preferably selected, but the addressing light is not limited to it in the invention:

Spectrum: Preferably, energy in the absorption wave range of the organic photosensitive layer 10 is large as much as possible.

Irradiation strength: Strength such that at the bright time, applied voltage to the light modulation layer 7 becomes equal to or greater than the voltage of the upper or lower threshold value by partial pressure with the organic photosensitive layer 10 and orientation of the liquid crystal in the light modulation layer 7 is changed and at the dark time, the voltage becomes less than it.

It is desirable that the addressing light applied by the light irradiation section 18 should be light having the peak strength in the absorption wave range of the organic photosensitive layer 10 and a narrow bandwidth as much as possible.

As the light irradiation device 18, specifically the following can be named:

(1-1) Section capable of forming any desired two-dimensional light emission pattern by scanning operation, such as placement of a light source (for example, cold-cathode tube, xenon lamp, halogen lamp, light emitting diode (LED), EL, laser, etc.) like a one-dimensional array or a combination with a polygon mirror (1-2) Combination of a uniform light source such as placement of a light source like an array or a combination with a light guide plate and a dimming element for producing a light pattern (for example, LCD, photo mask, etc.)

(2) Selfluminous type display such as placement of a light source like a plane (for example, CRT, PDP, EL, light emitting diode, FED, SED)

(3) Combination of (1-1), (1-2), or (2) and an optical element (for example, microlens array, cell hook lens array, prism array, viewing angle adjustment sheet)

(Power Unit)

The power unit (voltage applying unit) 17 may be any if it has a function of applying a predetermined bias voltage (drive voltage, write voltage) to the display element 1 and can apply any desired voltage waveform to the display element (between the electrodes) based on an input signal from the control circuit 16. However, preferably it has a high through rate. For example, a bipolar high-voltage amplifier, etc., can be used as the power unit 17.

The power unit 17 applies voltage to the display element 1 between the electrodes 5 and 6 through the controller 12 and the contact terminal 19.

(Control Circuit)

The control circuit 16 is a member having a function of appropriately controlling the operation of the power unit 17 and the light irradiation device 18 in response to image data from an external apparatus (an image capture apparatus, an image receiver, an image processing apparatus, an image playback apparatus, an apparatus having the functions of the apparatus, or the like). The control circuit 16 bears the control of the controller 12 depending on the form of the controller 12. The controller 12 is described later in detail.

(General Configuration)

Figure 2:
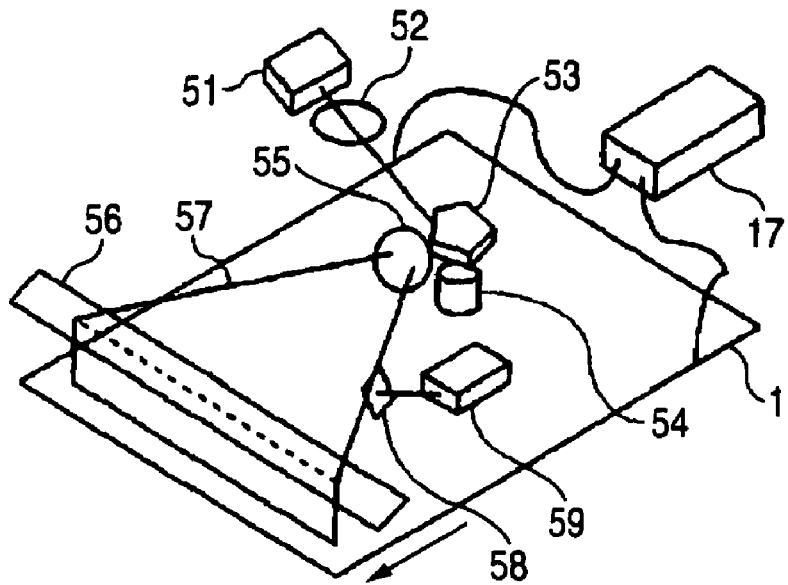
FIG. 2 is a perspective view to show an example of a driving apparatus.

FIG. 2 is a perspective view to show an example of the driving apparatus 2 that can be provided for the invention; it shows the case where a laser is used as the light irradiation unit. In the figure, the control circuit 16 is not shown.

The exposure optical system (light irradiation device 18) for conducting light irradiation uses a semiconductor laser as a light source 51 and is made up of a collimator lens 52, a polygon mirror 53, a polygon motor 54, an f-θ lens 55, a fold mirror 56, etc. A laser beam 57 is sent to a synchronous signal generator 59 through a beam adjustment mirror 58 and is used for synchronization of the scan timing. Although not shown in the figure, the controller (control circuit) of the driving apparatus is similar to that of a general electrophotographic laser exposure device.

The display element 1 can be fed in a subscanning direction in such a manner that the display element 1 is fixed like a plane as shown in the figure and a pulse motor is used or that the substrate of the display element 1 is formed of a film to make the display element 1 flexible and the display element 1 is fixed onto a cylindrical drum and is rotated by a motor.

Figure 3:
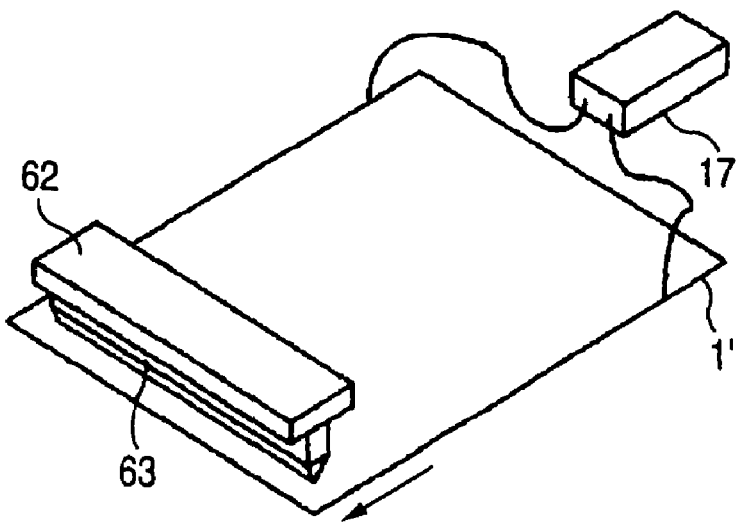
FIG. 3 is a perspective view to show another example of the driving apparatus.

FIG. 3 shows another example of the driving apparatus for the display element of the exemplary embodiment, wherein a light emitting diode array is used as the light irradiation device. It is similar to the example described above with FIG. 2 except that the light source for light irradiation is made up of a light emitting diode array 62 and a self-image formation type rod lens array 63.

<Basic Operation>

In the driving method according to the exemplary embodiment, a basic operation includes irradiating the photoconductive layer with addressing light having a predetermined wavelength and a predetermined light amount while applying a predetermined voltage between the pair of electrode layers to thereby causing texture change in the photoconductive layer for writing an image and displaying the image. The controller 12 (which may serve as a resistance control unit) is disposed in the voltage applying circuit. The operation of the controller 12 will be described later, only the basic operation will be described in this section.

In the exemplary embodiment, the liquid crystal layer of the self-holding type liquid crystal complex including the cholesteric liquid crystal and the transparent resin is formed as the light modulation layer 7 as already described. The display element 1 of the exemplary embodiment utilizes the bistable phenomenon of the cholesteric liquid crystal to switch between (A) selective reflection state based on the planar texture and (B) transmission state based on the focal conic texture, by the light irradiation device 18 while the power unit 17 is applying a predetermined voltage. Thereby, a display image having a memory property under no electric field is written.

Figure 21:
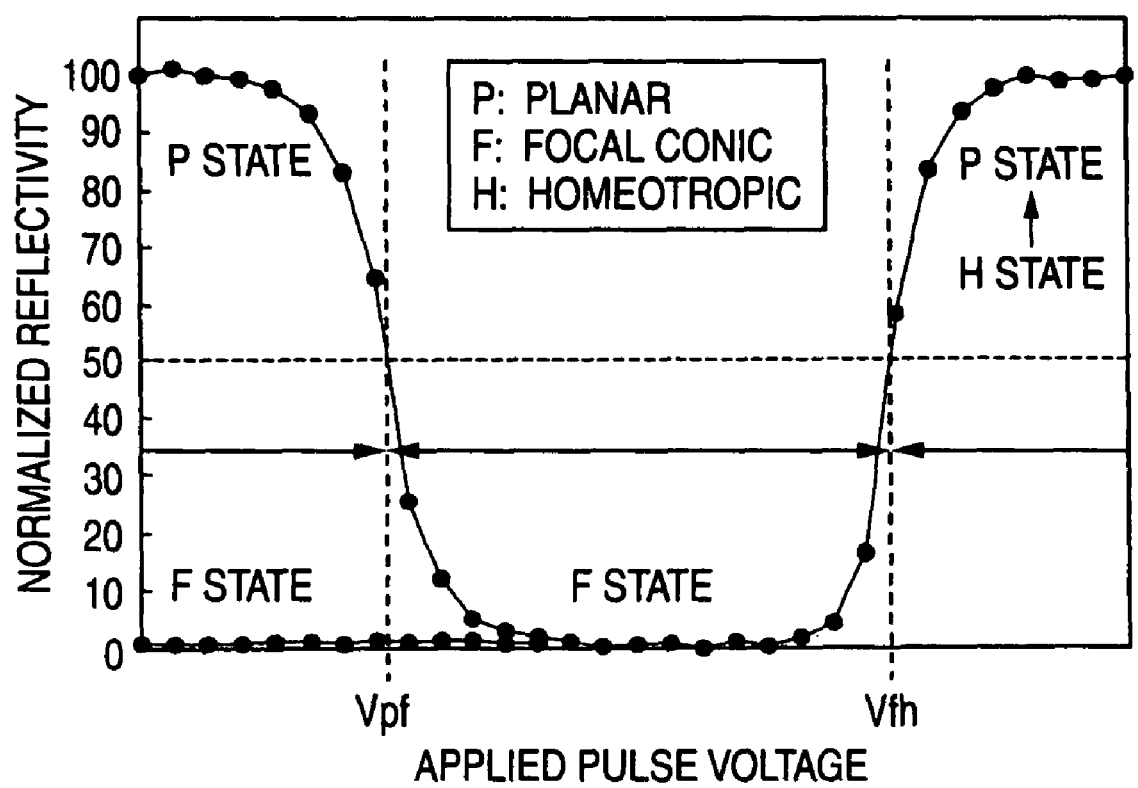
FIG. 21 is a graph to describe the switching behavior of cholesteric liquid crystal.

Referring to FIG. 21, the voltage applied by the power unit 17 is set to a voltage such that a partial voltage applied to the light modulation layer 7 becomes Vfh or more when a partial voltage in a range of Vpf to Vfh is applied to the light modulation layer 7 and the light irradiation device 18 irradiates with addressing light having a predetermined wavelength and a predetermined intensity, for example. In a state where such a voltage is applied, a texture of a part in the planar (P) state changes to the focal conic (F) state and a texture of a part in the focal conic (F) state does not change. As a result, all parts become the focal conic (F) state.

In this state, if the light irradiation device 18 selectively irradiates with the addressing light, a partial voltage of Vfh or more is applied only to the irradiated part and texture of the irradiated part is changed from the focal conic (F) state to the homeotropic (H) state. Then, if the applied voltage is released, the part irradiated with the addressing light and having the texture changed to the homeotropic (H) state becomes the planar (P) texture with a selective reflection state. On the other hand, the part not irradiated with the addressing light remains in the focal conic (F) texture. Thus, the texture is selectively changed and a display image is written.

In the exemplary embodiment, it is not limited which texture state change is to be used. No problem arises so long as texture is changed when the addressing light having the predetermined wavelength and the predetermined intensity is selectively irradiated to select reflection/transmission and write an image. Also in the display element 1 of the exemplary embodiment, the following texture change may be used. For example, a voltage of Vfh or more is applied and is released, etc., thereby bringing the full face to be in the planar (P) state. Then, irradiating with addressing light having the predetermined wavelength and the predetermined intensity is performed while a voltage of Vpf or less is applied to the light modulation layer 7 so that the voltage changes to Vpf or more when the addressing light is applied. Thereby, the irradiated part is brought into the focal conic (F) state. In this case, the part irradiated with the addressing light becomes the focal conic (F) texture having the transmission state and the part not irradiated with the addressing light becomes the planar (P) texture having the selective reflection state. Thus, the texture change is selectively made and an image is written.

[Operation of Controller 12]

Next, the operation of the controller 12 will be described in detail.

Figure 4:
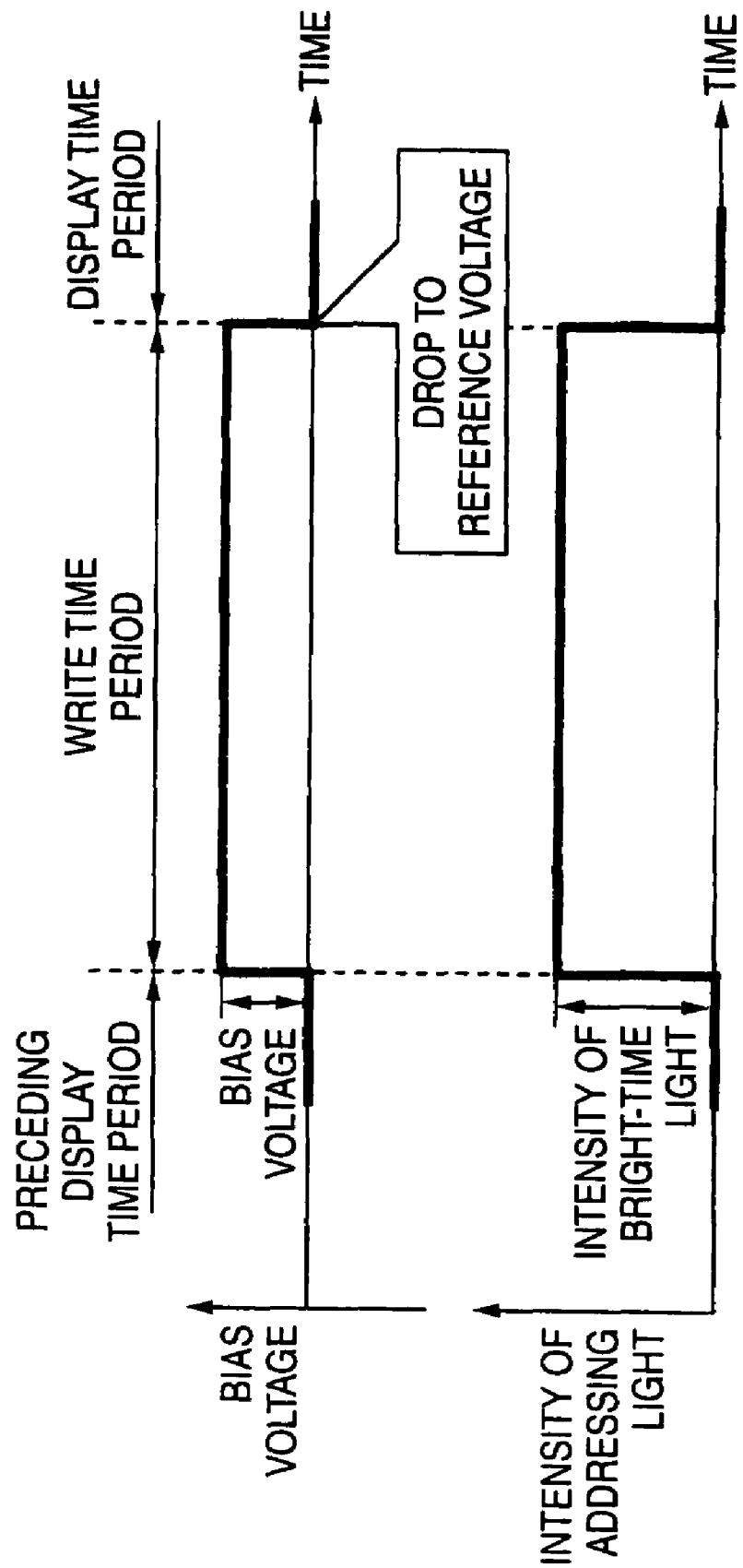
FIG. 4 is a chart to show a bias voltage and an intensity of addressing light in a time series manner in an operation example of a driving apparatus of a comparative example.

FIG. 4 is a chart to show a bias voltage and an intensity of addressing light in a time series manner in an operation example of a driving apparatus of a comparative example. In the comparative example, the controller 12 is removed from the driving apparatus 2 shown in FIG. 1 and a portion where the controller 12 was disposed is short-circuited. In this example, while a DC voltage is applied, irradiating with addressing light is performed throughout the entire time period in which the DC voltage is applied (write time period). In FIG. 4, the chart is shown only in a bright-time case where light irradiation is executed at the writing time.

In the operation of the driving apparatus of the comparative example, when the write time period terminates and applying of the voltage is stopped, the bias voltage is dropped to a reference potential as shown in FIG. 4. In other words, in the comparative example, applying of the voltage is stopped by dropping a potential of a part to which the bias voltage is applied, to the reference potential by the power unit 17.

Figure 5:
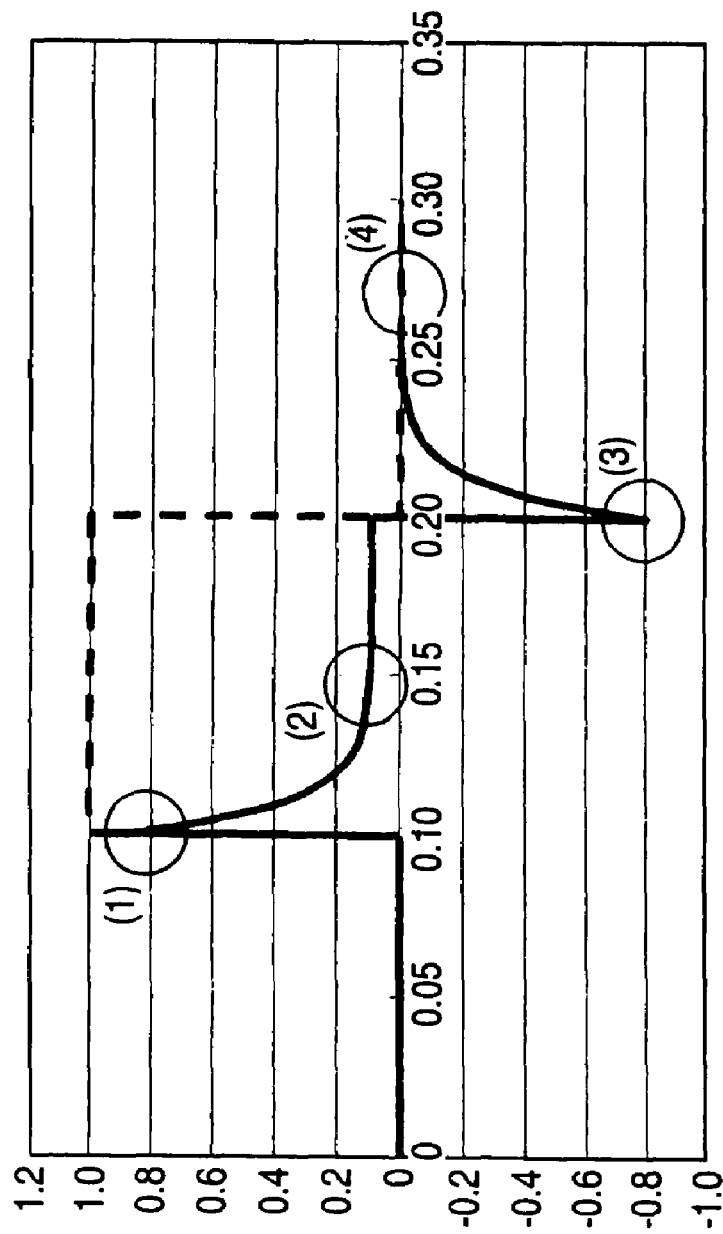
FIG. 5 is a graph where a waveform of a potential difference between electrodes in the example shown in FIG. 4 and a waveform of a partial voltage applied to a light modulation layer are superposed on each other.
Figure 6:
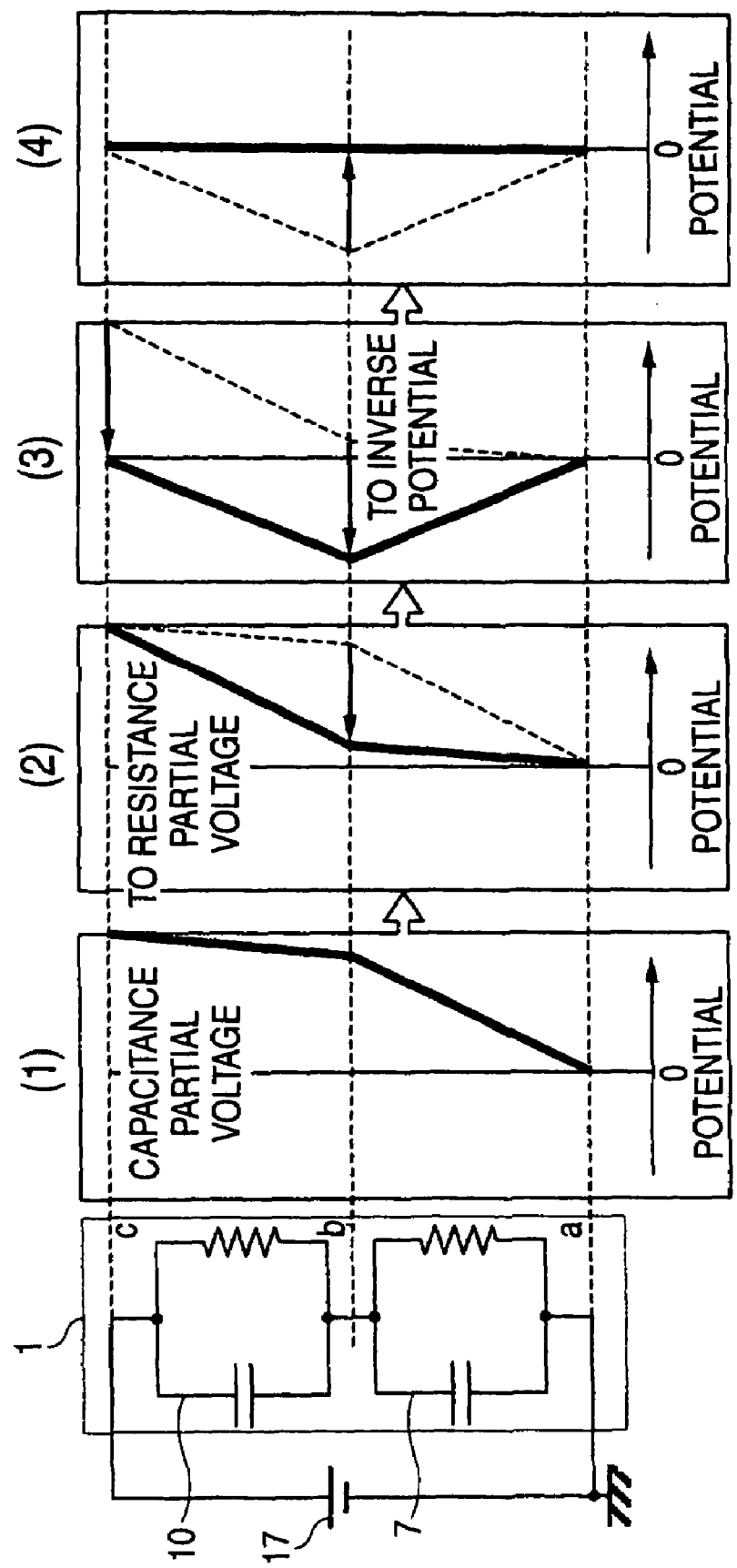
FIG. 6 schematically shows potentials (horizontal axis) in respective positions in a thickness direction of the display element (vertical axis) at each of time points (1) to (4) in the graph of FIG. 5, and also shows a voltage applying circuit containing an equivalent circuit of the display element at the left end.

FIG. 5 is a graph where a waveform of a potential difference between the electrodes 5 and 6 in the comparative example and a waveform of a partial voltage applied to the light modulation layer 7 are superposed on each other. FIG. 6 schematically shows the potential in respective positions in the display element 1 in the thickness direction at each of time points (1) to (4) in the graph of FIG. 5.

In FIG. 6, the graphs at the respective time points are shown side by side, and the corresponding voltage applying circuit (including a portion of the display element 1 between the electrodes 5, 6 and the power unit 17) is shown at the left end. In the voltage applying circuit shown at the left end, the light modulation layer 7 and the organic photosensitive layer 10 in the display element 1 are shown as equivalent circuits. In the graphs (1) to (4) in FIG. 6, the vertical axis indicates the positions in the thickness direction in the display element 1 and corresponds to respective positions in the light modulation layer 7 and the organic photosensitive layer 10 shown as the equivalent circuits at the left end.

If a bias voltage is applied between the electrodes 5 and 6, a potential difference determined by a capacitance ratio between the light modulation layer 7 and the OPC layer 10 occurs between the electrodes 5 and 6 (at the time point (1)).

However, the light modulation layer 7 and the organic photosensitive layer 10 have both a dielectric property and a resistance property as shown in the equivalent circuits in FIG. 6. Thus, an electric current starts to flow gradually into a resistance component side, and the potential changes from the capacitance partial voltage to a resistance partial voltage with time passage. Since impedances (CR time constants) of both the layers do not match, there is a difference between the capacitance partial voltage ratio and the resistance partial voltage ratio. In the example shown in FIG. 6, the partial voltage of the light modulation layer 7 decreases (at the time point (2)). At this time point, nonuniformity occurs between the charges accumulated in the capacitance component of the light modulation layer 7 and the charges accumulated in the capacitance component of the organic photosensitive layer 10. As a result, the difference charges are accumulated in a boundary between the light modulation layer 7 and the organic photosensitive layer 10 (position 'b') as residual charges.

From this state, if applying of the voltage is stopped, namely, the electrodes 5 and 6 are dropped to the reference potential (changing the potentials of the electrodes 5 and 6 to the same potential) according to the graph of FIG. 4, since the electrode 6 originally has the reference potential, the electrode 5 is forced to have the reference potential (at the time point (3)). Then, as seen in the graph (3) of FIG. 6, the residual charges caused by the CR mismatch appear as an inverse potential in the boundary between the light modulation layer 7 and the organic photosensitive layer 10 (the position 'b') as they are. This is also seen from a peak of the waveform in the opposite direction at the time point (3) in the graph of FIG. 5.

Figure 7:
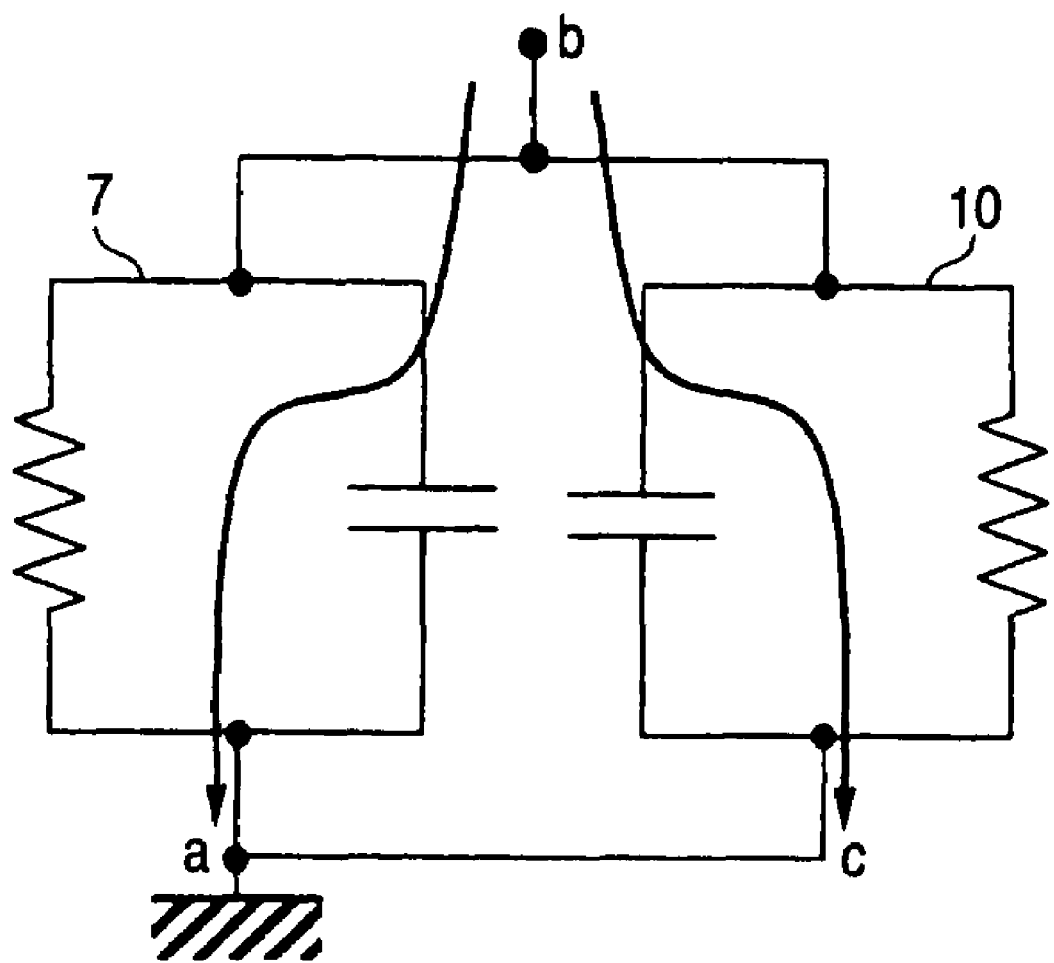
FIG. 7 shows an equivalent circuit of the display element after applying of the voltage is stopped, in the operation of the driving apparatus of the comparative example.

Since both ends of the light modulation layer 7 and the organic photosensitive layer 10 ('a' and 'c') are dropped to the reference potential, the equivalent circuit of the display element 1 at this stage is illustrated as in FIG. 7. Then, the charges remaining in the boundary between the light modulation layer 7 and the organic photosensitive layer 10 (the position 'b') pass through both the layers as indicated by the arrows and are relaxed with a time constant (complex CR time constant) which is determined based on the dielectric property and the resistance property that both the layers have. The potential in the boundary between the light modulation layer 7 and the organic photosensitive layer 10 (position of b) gradually drops to the reference potential. The potential changes as shown in the transition between the graphs (3) and (4) in FIG. 5.

At last, the potentials in all positions of the display element 1 reach the reference potential, and the potentials become constant as seen from the graph (4) in FIG. 6.

In the comparative example, the potentials are brought to be the reference potential at the time when applying of the voltage is stopped, the inverse potential derived from the residual charges are applied to the light modulation layer 7 and the organic photosensitive layer 10 after the applying of the voltage is stopped as shown in FIG. 7. Thus, the inverse potential would affect the orientation state of the light modulation layer 7 already selected is and it is concerned that an erroneous image may be formed such as degradation of the contrast of the provided display image.

This phenomenon occurs if the impedances (CR time constants) of the light modulation layer 7 and the organic photosensitive layer 10 do not match. If the impedances of both the layers match, residual charges do not occur and when the applying of the voltage is stopped, unnecessary inverse potential is not applied to the layers. In the photo-addressing type display element, however, the impedance of the photoconductive layer is changed in response to light/dark of an image. Thus, it is difficult to match the impedance of the photoconductive layer with that of the light modulation layer independently of light/dark of an image, and it is difficult to avoid accumulation of the unnecessary residual charges.

In the exemplary embodiment of the invention, to suppress or eliminate the affect of the inverse potential on the orientation state, when the applying of the voltage is stopped, control is performed so that a resistance to a current between the display element 1 and the power unit 17 in the voltage applying circuit becomes larger than that when the power unit 17 applies the voltage. The controller (resistance control unit) 12 has a function of controlling the resistance.

Here, the "resistance control unit" is not limited to a mere resistance element, but a concept of the "resistance control unit" includes elements capable of demonstrating the same effect such as a rectifier, an open (a state where air connects conductive wires at a high resistance value), and a switching element such as a TFT.

The operation of the controller 12 will be described below with an example in which a variable resistor is used as the controller 12 and control is performed so that the resistance to the current between the display element 1 and the power unit 17 in the voltage applying circuit becomes larger than that when a bias voltage is applied.

Figure 8:
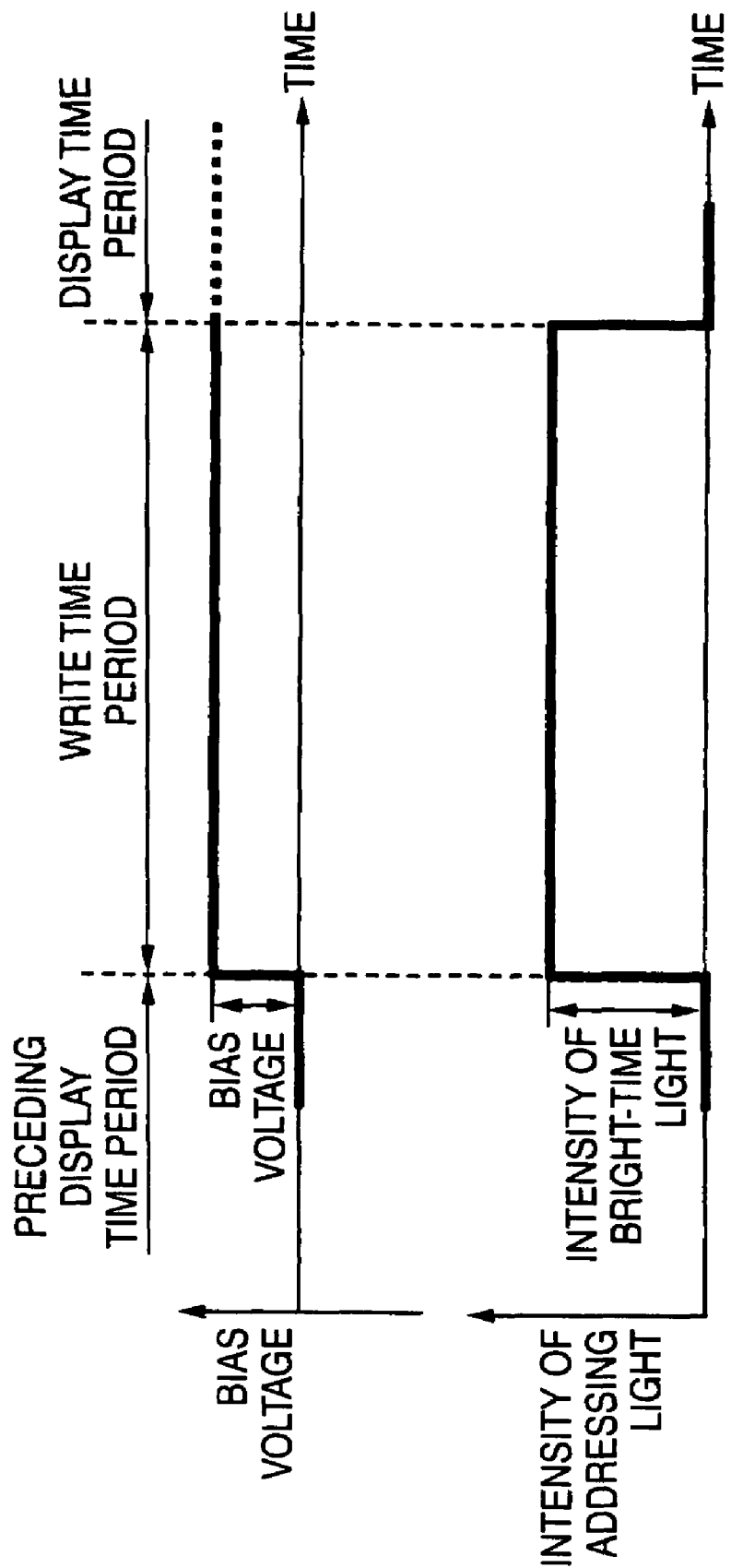
FIG. 8 is a chart to show a bias voltage and an intensity of addressing light in a time series manner in an operation example of the driving apparatus according to the exemplary embodiment.

FIG. 8 is a chart to show a bias voltage and an intensity of addressing light in a time series manner in an operation example of the driving apparatus of the exemplary embodiment using the driving apparatus 2 illustrated in FIG. 1. In this example, while a DC voltage is applied, irradiating with the addressing light is performed throughout the entire time period in which the DC voltage is applied (write time period) as in the comparative example. In FIG. 8, the chart is shown only in the case where light irradiation is executed at the writing time (bright time).

In the operation of the driving apparatus of this example, when the write time period terminates and the applying of the voltage is stopped, the bias voltage is not dropped to the reference potential as shown in FIG. 8 and control is performed so that the resistance to the current between the display element 1 and the power unit 17 in the voltage applying circuit becomes larger than that when bias voltage is applied. Therefore, the potential at the time when the applying of the voltage is stopped is retained by the capacitance components of both the layers.

Figure 9:
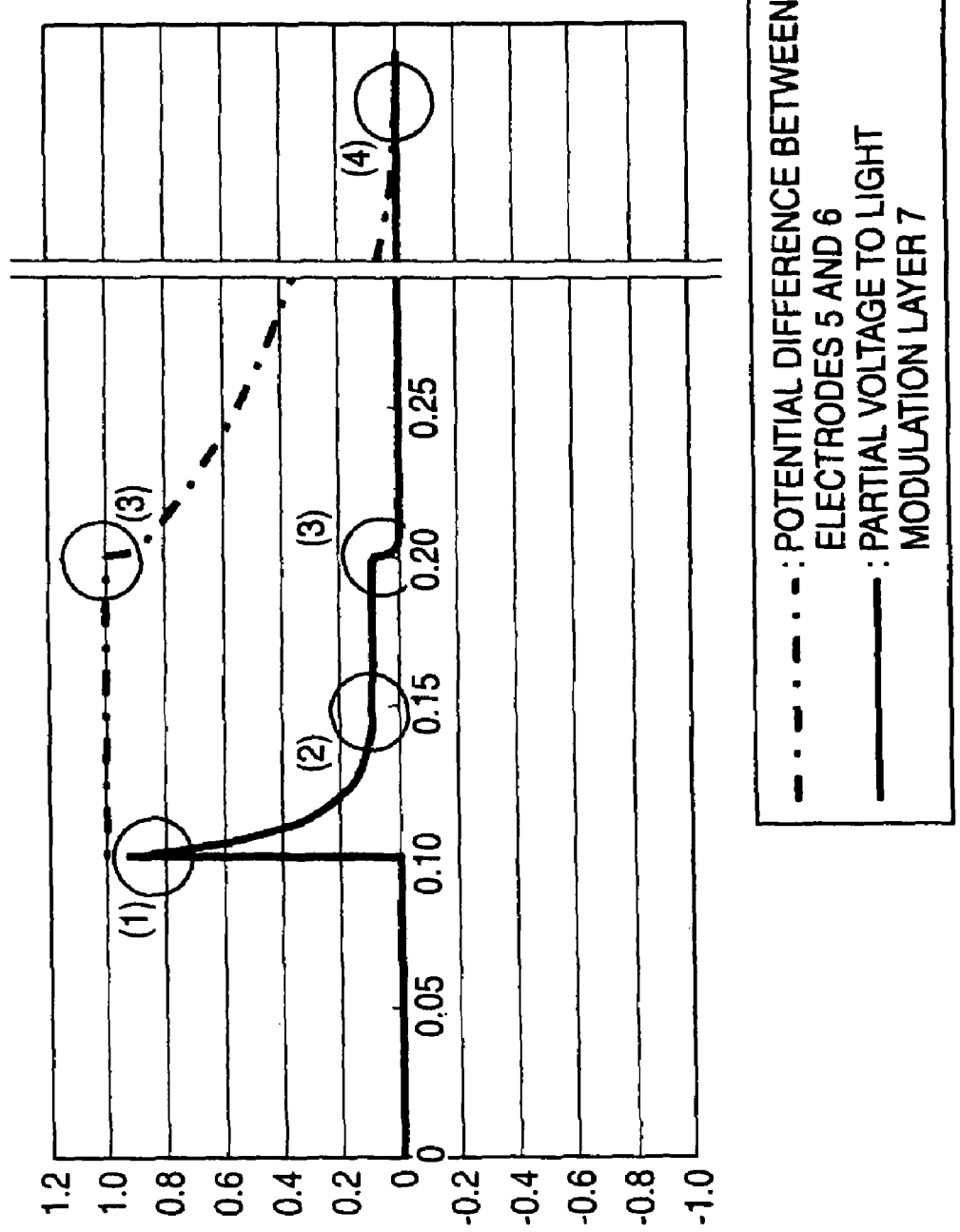
FIG. 9 is a graph where a waveform of the potential difference between the electrodes in the example shown in FIG. 8 and a waveform of the partial voltage applied to the light modulation layer are superposed on each other.
Figure 10:
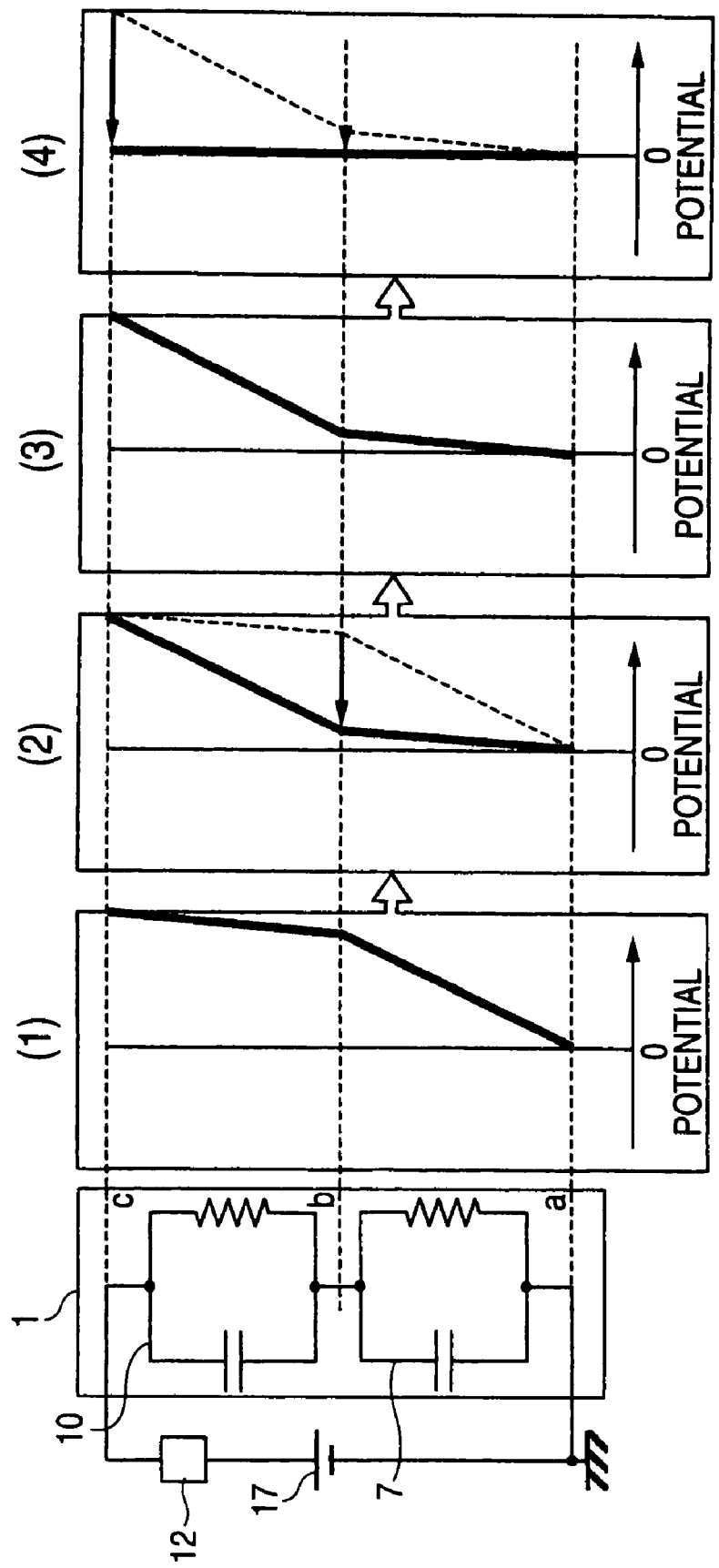
FIG. 10 schematically shows the potential (horizontal axis) in the respective positions in the thickness direction of the display element (vertical axis) at each of time points (1) to (4) in the graph of FIG. 9 and shows a voltage applying circuit containing an equivalent circuit of the display element at the left end.

FIG. 9 is a graph in which a waveform of a potential difference between the electrodes 5 and 6 in this example and a waveform of a partial voltage applied to the light modulation layer 7 are superposed on each other. FIG. 10 schematically shows potentials in respective positions in the display element 1 in the thickness direction at each of time points (1) to (4) in the graph of FIG. 9.

In FIG. 10, the graphs at the respective time points are shown side by side and the corresponding voltage applying circuit (including the display element 1 and the power unit 17) is shown at the left end. In the voltage applying circuit shown at the left end, the light modulation layer 7 and the organic photosensitive layer 10 in the display element 1 are shown as equivalent circuits. In the graphs (1) to (4) in FIG. 10, the vertical axis indicates the positions in the thickness direction in the display element 1 and corresponds to respective positions in the light modulation layer 7 and the organic photosensitive layer 10 shown as the equivalent circuits at the left end If a bias voltage is applied between the electrodes 5 and 6, a potential difference determined by the capacitance ratio between the light modulation layer 7 and the OPC layer 10 occurs between the electrodes 5 and 6 (at the time point (1)). The potential changes from the capacitance partial voltage to the resistance partial voltage with time passage, and a partial voltage of the light modulation layer 7 decreases (at the time point (2)) as in the comparative example.

In this state, if the applying of the voltage is stopped according to the graph of FIG. 8, namely, control is performed so that the resistance to the current between the display element 1 and the power unit 17 in the voltage applying circuit becomes larger than that when the bias voltage is applied, the electrode 6 has the original reference potential and the electrode 5 is brought into a state where the high potential is held by the capacitance component of each layer (at the time point (3)). Then, as seen from the graph (3) of FIG. 10, the residual charges caused by CR mismatch (position 'b') do not appear as an inverse potential, and the potentials gradually reach the reference potential in the graph (4)) as they are. The electrode 5 which is at the high potential (position 'c') also gradually approaches the reference potential as shown as "potential difference between electrodes 5 and 6" in FIG. 9. It is noted that the "write time period" in FIG. 8 is equivalent to a period in which the bias voltage is applied to the display element 1.

Also, here, a control apparatus (not shown; e.g., a personal computer) controls the variable resistor and applying of the bias voltages to the display element 1.

Figure 11:
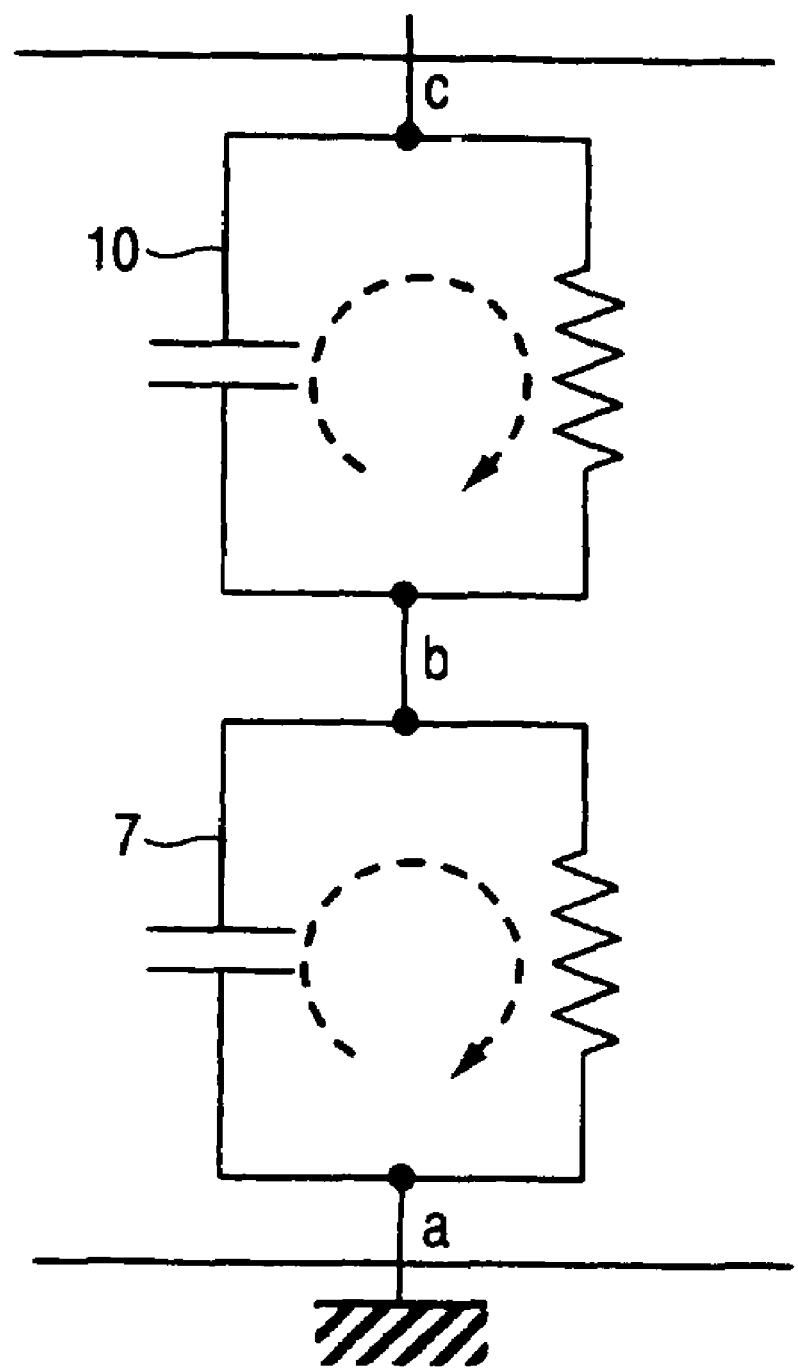
FIG. 11 is a circuit diagram to show an example of an equivalent circuit of the display element after applying of the voltage is stopped in the operation of the driving apparatus according to the exemplary embodiment.

Since the light modulation layer 7 and the organic photosensitive layer 10 are brought into an electrically independent state (the resistance therebetween is high and no current flows) at both ends (a and c), the equivalent circuit of the display element 1 in this state is illustrated as in FIG. 11. Then, the high potential held in the electrode 5 (the position 'c') and the potential left in the boundary between the light modulation layer 7 and the organic photosensitive layer 10 (the position 'b') are relaxed by a series circuit including the CR components of both the layers as indicated by the arrows of the dotted lines and gradually lower and drop to the reference potential. Transition of the graphs between (3) and (4) in FIG. 9 show how the potential changes.

At last, as seen in the graph (4) of FIG. 10, potentials at all the positions of the display element reach the reference potential and the potential becomes constant.

In the example in which the resistance is increased at the time when the applying of the voltage is stopped, the inverse potential derived from the residual charges does not occur after the applying of the voltage is stopped. The residual charges are relaxed in each of the light modulation layer 7 and the organic photosensitive layer 10 and disappear, as shown in FIG. 10. Thus, the concern that the inverse potential affects the orientation state of the light modulation layer 7 already selected is eliminated, and the contrast of the obtained display image can be made good.

In the above example, the control is performed by using the variable resistor so that the resistance to the current between the display element 1 and the power unit 17 in the voltage applying circuit becomes larger than that when the bias voltage is applied. However, the invention may adopt any configuration so long as the resistance to the current between the display element and the voltage applying unit in the voltage applying circuit is controlled at the time the applying of the voltage is stopped.

For example, the voltage applying circuit may become open, namely, air may connect conductive wires at a high resistance value. Also, if the resistance is controlled so as to become higher even slightly at the time when the applying of the voltage is stopped than that when the voltage is applied, the advantages of the exemplary embodiment can be expected. When a circuit is opened in a state where a potential difference exists between electrodes, the above control can be reliably performed by simple operation, but care must be taken so that a human being does not touch the open portion. If such a configuration is adopted that the circuit is not directly opened and the same effect is provided as that achieved when the circuit becomes open, safety is also ensured.

That is, if sharp change in the potentials of both electrodes of the display element to the same potential shown in the graph (3) of FIG. 6 is suppressed by controlling the resistance to the current between the display element and the voltage applying unit in the voltage applying circuit at the time when the applying of the voltage is stopped and the state is close to the state shown in FIG. 10 (3) even slightly, the effect of the inverse potential derived from the residual charges can be suppressed and the advantages of the exemplary embodiment can be sufficiently expected.

[Examples of Resistance Control Unit]

As described above, the resistance control unit of the exemplary embodiment may have the function of controlling the resistance to the current between the display element and the voltage applying unit in the voltage applying circuit at the time when the applying of the voltage is stopped (specifically, controlling so that the resistance at the time when the applying of the voltage is stopped becomes higher than that when the voltage is applied). Specifically, examples of the resistance control unit include A: switch, B: variable resistor, and C: rectifier.

Examples of the resistance control unit will be described below by taking the case where it is used as the controller 12 in the display of the exemplary embodiment shown in FIG. 1 as an example. In the following description, it is assumed that the voltage applied by the power unit 17 is a DC voltage with the electrode 6 side having a positive polarity.

(A: Switch)

The switch means a switch having a contact that can select conduction or space insulation of current by bringing the contact in a closed state or an open state. A mechanical relay for opening or closing a contact by energization or non-energization of an electromagnet or motor rotation may be used.

Figure 12:
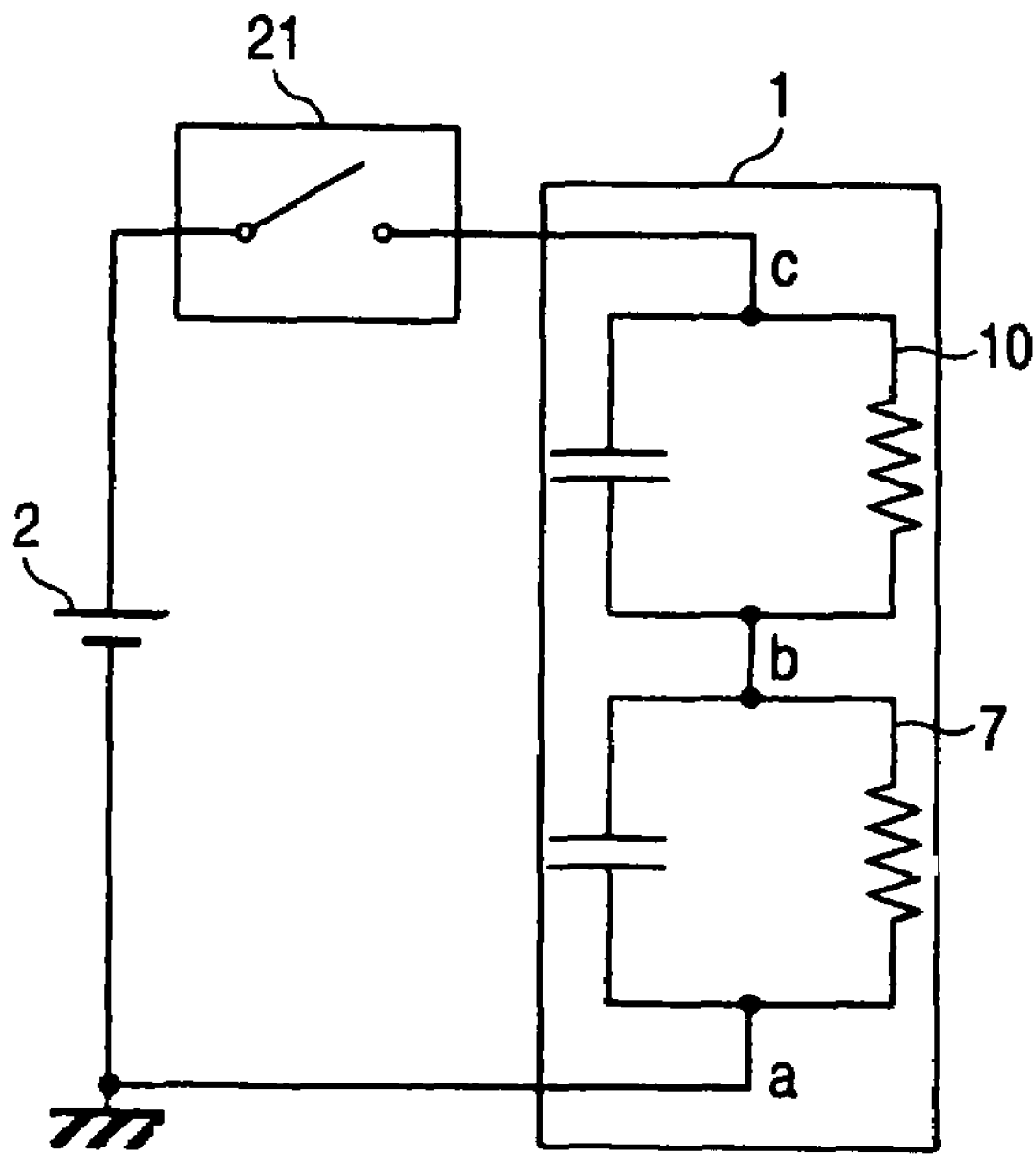
FIG. 12 is a circuit diagram of the voltage applying circuit (the display element is an equivalent circuit) when a switch is used as a controller.

FIG. 12 is a circuit diagram of the voltage applying circuit (the display element 1 is an equivalent circuit) when a switch 21 is used as the controller 12 in FIG. 1. In this case, voltage application is started in a state where the switch 21 is turned on for closing the circuit. Also, when the switch 21 is turned off for bringing the circuit into an open state at the time when the applying of the voltage is stopped, the current on the electrode 6 side (point c side) in the voltage applying circuit can be completely shut off. That is, it can be said that the resistance at the time when the applying of the voltage is stopped is higher than that when the voltage is applied.

To use a replay device as a switch, circuitry may be configured so that electric on/off control can be performed in accordance with a signal from the control circuit 16.

Hitherto, it has been a usual practice to schematically draw a part having a shape similar to a switch as a switch of a power unit in a voltage applying circuit. However, when a voltage is applied to a photo-addressing type display element which is an electric device having a configuration containing a dielectric, in order to stop applying of the voltage, it is a common practice to bring the applied voltage to be the reference potential and schematically drawing the having the shape similar to the switch shows only ideally and simply a member for controlling the start and the stop of the applying of the voltage by the power unit. Therefore, if such a part similar to a switch in a voltage applying circuit diagram exists in a document was published before this application is filed, it neither discloses nor suggests the configuration of the invention.

(B: Variable Resistor)

Figure 13:
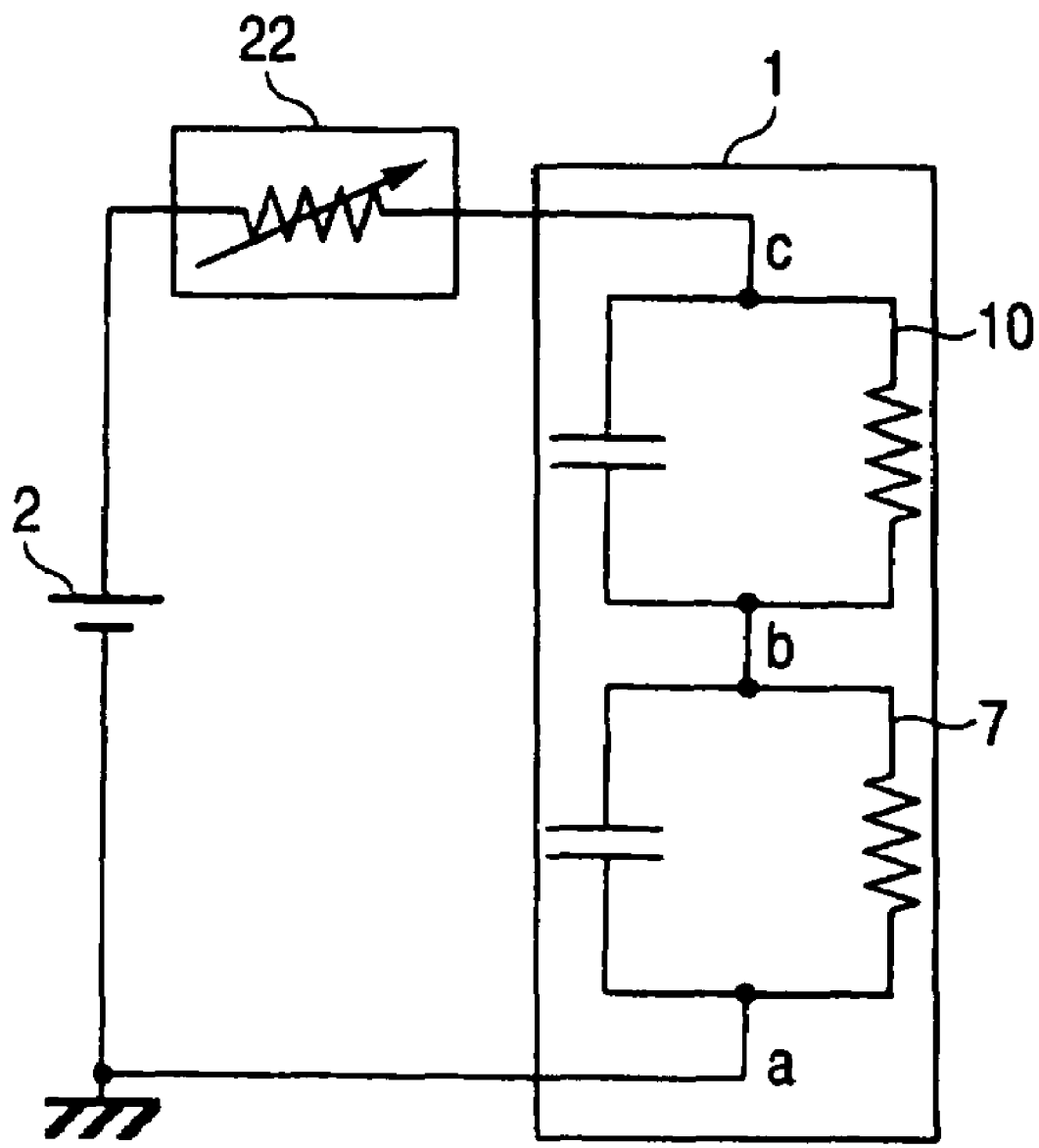
FIG. 13 is a circuit diagram of the voltage applying circuit (the display element is an equivalent circuit) when a variable resistor is used as the controller.

FIG. 13 is a circuit diagram of the voltage applying circuit (the display element 1 is an equivalent circuit) when a variable resistor 22 is used as the controller 12 in FIG. 1. In this case, when a voltage is applied, the variable resistor 22 is set in a low resistance state. Thereby, the voltage applying circuit is brought into conduction. At the time when the applying of the voltage is stopped, the variable resistor 22 is brought into a high resistance state. Thereby, a current on the electrode 6 side (point 'c' side) in the voltage applying circuit is limited.

As the variable resistor, a general dial type or slide type may be used, of course. When any of them is used, a resistance value may be controlled in such a manner that the dial type or slide type is mechanically moved appropriately in accordance with a signal from the control circuit 16. Of course, no problem arises so long as it is made possible to control the resistance value electrically.

Figure 14:
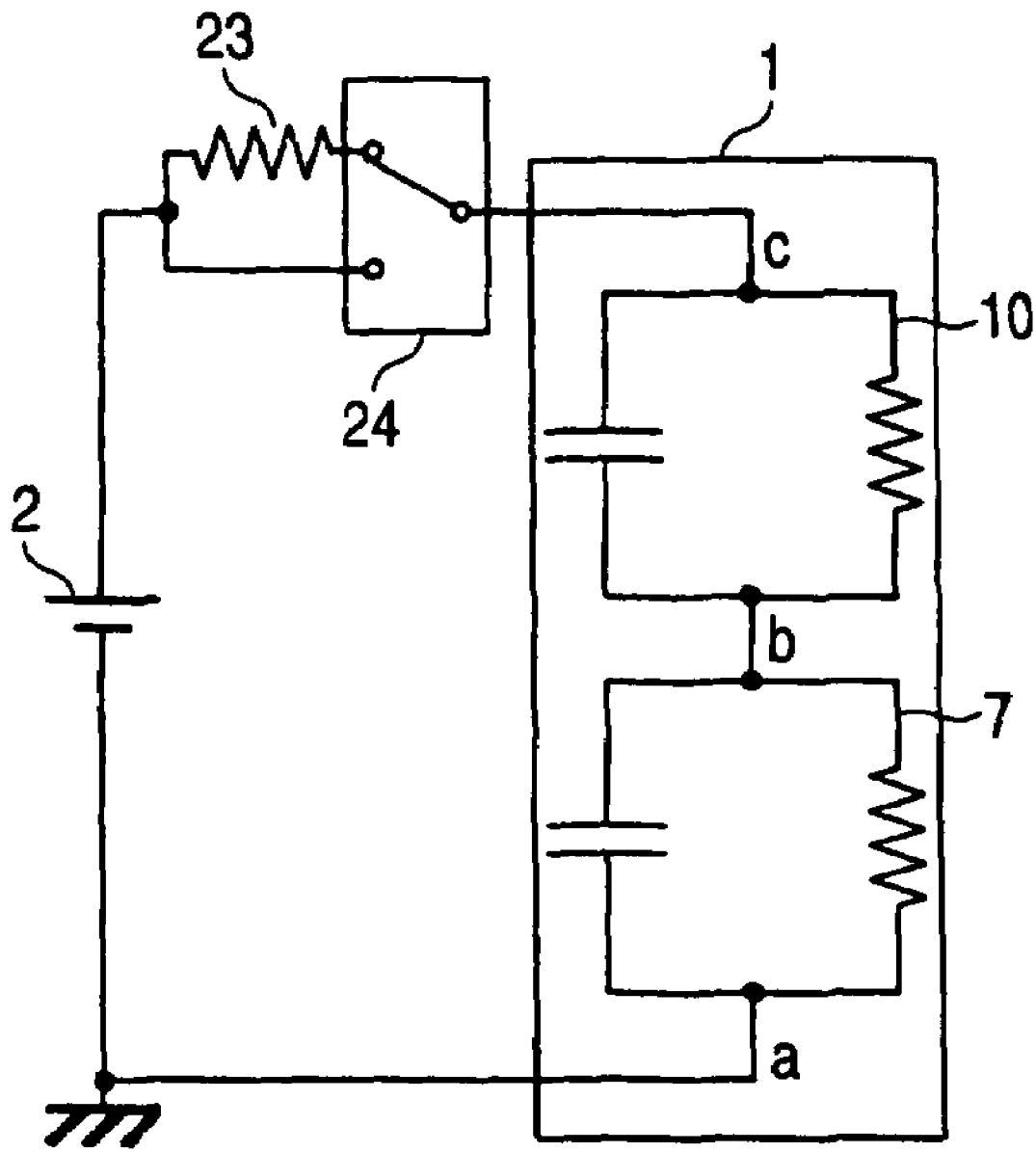
FIG. 14 is a circuit diagram of the voltage applying circuit (the display element is an equivalent circuit) to show a modified example wherein a variable resistor is used as the controller.

FIG. 14 is a circuit diagram of the voltage applying circuit (the display element 1 is an equivalent circuit) to show a modified example when a variable resistor is used as the controller 12 in FIG. 1. In this modified example, selection can be made between a resistor 23 having a high resistance and conduction (low resistance) by a changeover switch (SW) 24. This configuration is also contained in the concept of the variable resistor of the exemplary embodiment. When this configuration is used, the resistance value may also be controlled by appropriately switching the changeover switch 24 in accordance with a signal from the control circuit 16.

In addition, a variable resistor circuit (contactless switch circuit) that can control source-to-drain resistance by adjusting the gate voltage of a transistor may also be used. This configuration is also contained in the concept of the variable resistor according to the exemplary embodiment. When this configuration is used, the source-to-drain resistance may also be controlled by adjusting the gate voltage in accordance with a signal from the control circuit 16.

The resistance value of the variable resistor may be set to 1 k$\Omega$ or less as a low resistance in the voltage application state to reduce the voltage application loss. Also, the resistance value of the variable resistor may be set to 100$\Omega$ or less. On the other hand, since the effect of limiting the current between the display element 1 and the power unit 17 is achieved if a higher resistance is set even slightly than that when the voltage is applied, the lower limit of the high resistance at the when the applying of the voltage is stopped does not exist. In order to limit the current on a higher level, the resistance value may be set to 100 M$\Omega$ or more. Also, it may be set to 1 G$\Omega$ or more.

(C: Rectifier)

Generally, a semiconductor diode is used as a rectifier. Any element may be used so long as it is contained in the concept of a rectifier, such as a rectifier tube, for example.

Figure 15:
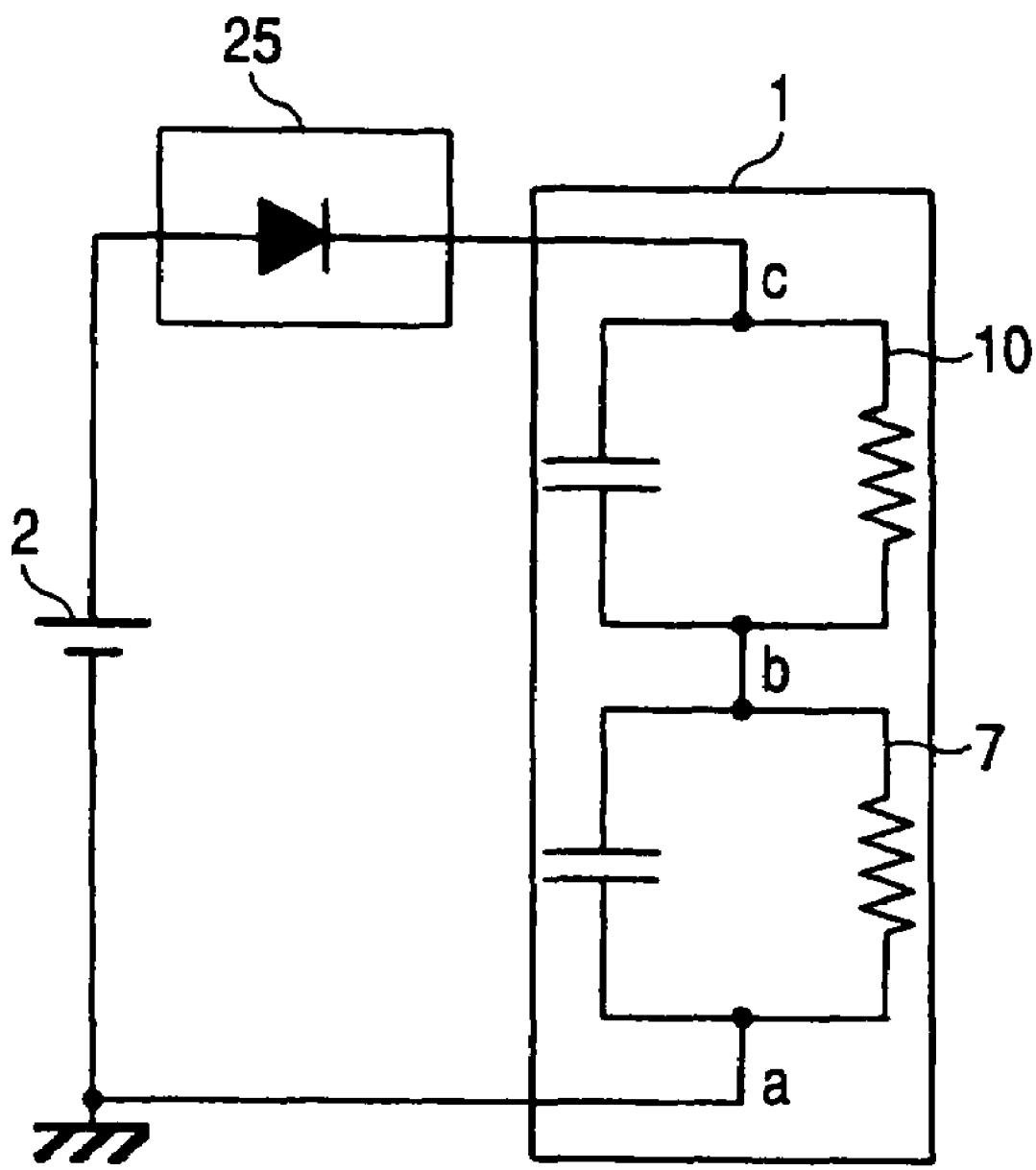
FIG. 15 is a circuit diagram of the voltage applying circuit (the display element is an equivalent circuit) when a rectifier is used as the controller.

FIG. 15 is a circuit diagram of the voltage applying circuit (the display element 1 is an equivalent circuit) when a rectifier 25 is used as the controller 12 in FIG. 1. The rectifier 25 is disposed to have an orientation such that current is easy to flow in the current direction of the voltage applied by the power unit 17 and is hard to flow in the opposite direction (the electric resistance in the current direction becomes low as compared with that in the opposite direction), as shown in FIG. 15.

When the rectifier 25 is used, a current flowing in a direction from the display element 1 to the power unit 17 at the time when the applying of the voltage is stopped directs an opposite direction to a current direction when the voltage is applied. The rectifier 25 is disposed so that this direction involves a high resistance. Therefore, the current after the applying of the voltage is stopped in the voltage applying circuit can be limited without performing any special operation before or after the applying of the voltage is stopped.

The examples of the resistance control unit described above are an illustration of the case where the applied voltage by the power unit 17 is a DC voltage as previously described. A: switch and B: variable resistor may also be applied in a similar manner if an AC voltage is applied. If the applied voltage by the power unit 17 is an AC voltage, C: rectifier cannot be applied.

While the display element has been described in detail with reference to the exemplary embodiments, it is to be understood that the invention is not limited to the specific exemplary embodiment. In the exemplary embodiment, the display element for single-color image formation with the light modulation layer only as one layer has been described as an example. However, the display element may be a display element capable of forming a multicolor image as it has the light modulation layer and any other layer as multiple layers as required. At this time, light modulation layers capable of displaying at least the three primary colors of blue, green, and red may be deposited for providing a display element capable of forming a full color image.

In addition, those skilled in the art may change and modify the laminated product of the invention, the manufacturing method of the invention, or the display element of the invention appropriately in accordance with the known knowledge. Even if such change or modulation is made, the result is still contained in the scope of the invention so long as it includes the laminated product of the invention, the manufacturing method of the invention, or the display element of the invention, of course.

EXAMPLES

The exemplary embodiments will be described more specifically with reference to examples. However, it should be noted that the invention is not limited to the following examples.

<Manufacturing of Display Element>

As a photo-addressing type display element according to an exemplary embodiment, a display element 1 in FIG. 1 is manufactured by way of trial. Also, an image is written using driving apparatuses or driving methods according to the exemplary embodiment and the comparative example for the photo-addressing type display element. Description will be given below with reference to FIG. 1.

(Manufacturing of Substrate on Organic-Photoconductive-Layer Side)

A piece of 50.8 mm (2 inch) squared is cut out from a polyethylene terephthalate (PET) film (manufactured by Toray Industries, Inc., high beam) of 125 μm in thickness formed with ITO (surface resistance 300$\Omega$/□) on one side to form a substrate 4 and an electrode 6. A coating material is prepared by dispersing, with a paint shaker, a charge generation material (titanile phthalocyanine pigment) into a solution in which polyvinyl butyral resin is dissolved in butanol. The coating material is applied to the ITO (electrode 6) surface and is dried by a spin coat method so that a dry film has a thickness of 0.2 μm. As a result, a charge generation layer 15 is formed.

Next, a coating material prepared by dissolving a polycarbonate resin and a charge transport material (benzidine N, N'-bis(3-methylphenyl-1,1'-biphenyl-4,4'-diamine) in monochlorobenzene is applied onto the charge generation layer 15 and is dried by a dip coat method so that a dry film has a thickness of 6 μm. As a result, a charge transport layer 14 is formed.

Further, a coating material prepared by dispersing, by a paint shaker, a charge generation material (titanile phthalocyanine pigment) in a solution in which polyvinyl butyral resin is dissolved in butanol is applied onto the charge transport layer 14 by a spin coat method and is dried so that a dry film has a thickness of 0.2 μm. As a result, a charge generation layer 13 is formed. Thus, an organic photosensitive layer 10 made up of the tree layers of the charge generation layer 15, the charge transport layer 14, and the charge generation layer 13 is formed.

On the organic photosensitive layer 10, a polyvinyl alcohol aqueous solution in which carbon black pigment is dispersed is prepared by a spin coat method so that dry thickness becomes 1.2 μm, so as to form a colored layer 9. Further, as a layer above the colored layer 9, a two-pack urethane laminate agent diluted with butyl acetate (manufactured by Mitsui Takeda Chemical, A315/A50) is applied by a spin coat method so that a dry film has a thickness of 1.0 μm, so as to form a laminate layer 8 to manufacture a substrate on the organic-photoconductive-layer side.

(Manufacturing of Substrate on Light-Modulation-Layer Side)

As cholesteric liquid crystal, nematic liquid crystal (manufactured by Merck, Ltd., E7) of 77.5% by mass, dextrorotatory chiral agent (manufactured by Merck, Ltd., CB15) of 18.8% by mass, and dextrorotatory chiral agent (manufactured by Merck, Ltd., R1011) of 3.7% by mass are mixed to prepare a material for reflecting green.

The cholesteric liquid crystal is emulsified in a sodium dodecylbenzenesulfonate aqueous solution of 0.25% by mass under a condition of nitrogen pressure 11.8 kPa (0.12 kgf/$cm^2$) using a film emulsifying device (manufactured by SPG Technology Co., Ltd., Microkit) in which a ceramic porous film of 4.2 μm in diameter is set. The obtained emulsion is in a state close to a monodisperse state. Also, in the obtained emulsion, the particle size average of cholesteric liquid crystal drops is 14.9 μm and particle size standard deviation is 1.32 μm.

Next, the emulsion is left at rest, the cholesteric liquid crystal drops are settled out, and emulsion condensed with supernatant liquid removed is obtained. Four mass parts of 7.7% by mass aqueous solution of acid process bone gelatin (manufactured by Nipp, Inc., jelly strength 314) are added to one mass part of the condensed emulsion, thereby obtaining a light modulation layer application liquid with the nonvolatile matter volume ratio in the light modulation layer application liquid being about 0.15 and the cholesteric liquid crystal volume ratio in the nonvolatile matter being about 0.70.

The same PET film with ITO electrode (High beam manufactured by Toresha) as the one used as the substrate 4 and the electrode 6 in (Manufacturing of substrate on organic-photo-conductive-layer side) described above is used as a substrate 3 and an electrode 5 and the light modulation layer application liquid heated to 50° C. to place gelatin in a sol state is applied onto the ITO surface side with an applicator with a micrometer with a gap adjusted so that the wet film thickness after the application becomes 90 μm.

After it is held for 15 minutes in a high-temperature, high-humidity chamber of 50° C./RH 90%, it is dried for 12 hours at room temperature, a PDLC layer of about 12 μm in thickness with monodisperse cholesteric liquid crystal drops of 15 μm in diameter dispersed in a polymer binder as a monolayer densely in a slightly flat shape is formed as a light modulation layer 7 to manufacture a substrate on the light-modulation-layer side.

(Bonding of Substrates)

The substrate on the organic-photoconductive-layer side and the substrate on the light-modulation-layer side thus manufactured are put on each other so that the light modulation layer 7 and the laminate layer 8 face each other and a part of an end face slightly shifts, and are bonded through a laminator at 100° C. to obtain a light modulation element 1.

The functional films on the shifted end surface are removed for exposing the ITO electrode so that both electrodes 5 and 6 can be brought into a state where both the electrodes 5 and 6 are electrically connectable from the outside of the finally obtained display element 1.

The appearance of the obtained display element 1 is that the light modulation layer 7 shows selective reflection of green.

A commercially available clip with leads is connected to both the electrodes 5 and 6 of the obtained display element 1 as a contact terminal 19.

<Manufacturing of Dummy Element for Waveform Observation>

(Manufacturing of Organic Photoconductive Layer Dummy)

The substrate on the organic-photoconductive-layer side obtained in a similar manner to that in (Manufacturing of substrate on organic-photoconductive-layer side) described above and the same PET film with ITO electrode (High beam manufactured by Toray Industries Inc.) which one used as the substrate 4 and the electrode 6 in (Manufacturing of substrate on organic-photoconductive-layer side) described above are put on each other so that the laminate layer 8 and the ITO face are opposed to each other, and are bonded through a laminator at 100° C. to manufacture an organic photoconductive layer dummy.

(Manufacturing of Light Modulation Layer Dummy)

On the same PET film with ITO electrode (High beam manufactured by Toresha) which is one used as the substrate 4 and the electrode 6 in (Manufacturing of substrate on organic-photoconductive-layer side) described above, a polyvinyl alcohol solution in which carbon black pigment is dispersed is formed by a spin coat method so that a dry film has a thickness of 1.2 μm, so as to form a colored layer 9. Further, as a layer above the colored layer 9, a two-pack urethane laminate agent diluted with butyl acetate (manufactured by Mitsui Takeda Chemical, A315/A50) is applied by a spin coat method so that a dry film has a thickness of 1.0 μm so as to form a laminate layer 8.

The light modulation layer 7 of the substrate on the light-modulation-layer side obtained in a similar manner to that of (Manufacturing of substrate on light-modulation-layer side) described above is put so that the laminate layer and the light modulation layer face each other, and they are bonded through a laminator at 100° C. to manufacture a light modulation layer dummy.

<Manufacturing of Driving Apparatus and Display>

Example 1

In the Case where a Switch is Used as a Controller 12

A mechanical power relay (manufactured by Omron Corporation, G5NB model) for opening a circuit at the end of an applied voltage waveform is used as a controller 12, and a high-speed and high-voltage amplifier (manufactured by Matsusada Precision Inc., HEOPT1B-60 model) is used as a power unit 17 and is connected together with the electrodes 5 and 6 of the display element 1 as shown in FIG. 1 to form the voltage applying circuit.

On the other hand, a color light emitting diode light source (manufactured by CCS Inc., HLV-3M-RGB model) is used as a light source, and a light irradiation device 18 is configured so as to be able to irradiate the non-display surface of the display element 1 (surface on the write side). The light irradiation device 18 can irradiate with red light of a peak wavelength of 625 nm and a half band width of 20 nm.

A multichannel DAQ board (6713 model manufactured by National Instruments) and control software (LabVIEW manufactured by National Instruments) are used as a control circuit 16, and wiring is conducted so that the operation of the power unit 17, the light irradiation device 18, and the controller (mechanical power relay) can be controlled as required based on image data from a personal computer.

The driving apparatus of an example 1 and a display having the display element connected to the driving apparatus are thus manufactured.

Example 2

In the Case where a Variable Resistor is Used as a Controller 12

A voltage applying circuit is formed and a light irradiation device 18 and a control circuit 16 are formed as in example 1 except that a photo MOS-FET relay (manufactured by Omron Corporation, G3VM-354 model. On-time resistance 15Ω/off-time leak current 1 μA) for changing a resistance value at the end of the applied voltage waveform to a control current is used in place of the mechanical power relay as the controller 12 in the example 1. The driving apparatus of an example 2 and a display having a display element connected to the driving apparatus are manufactured.

Example 3

In the Case where a Rectifier is Used as Controller 12)

A voltage applying circuit is formed and a light irradiation device 18 and a control circuit 16 are formed as in the example 1 except that a semiconductor diode (manufactured by General Semiconductor, RGP02-02E model) for limiting current in the direction of a power unit 17 by rectification effect at the end of an applied voltage waveform is used in place of the mechanical power relay as the controller 12 in the example 1. The driving apparatus of an example 3 and a display having a display element connected to the driving apparatus are manufactured. The orientation of the semiconductor diode is exactly as shown in FIG. 15.

Control Example 1

In the Case where the Controller 12 is not Provided

A voltage applying circuit is formed and a light irradiation device 18 and a control circuit 16 are formed as in the example 1 except that the controller 12 in FIG. 1 is eliminated and the electrodes 5 and 6 of the display element 1 and the power unit 17 are directly connected. The driving apparatus of a comparative example 1 and a display having a display element connected to the driving apparatus are manufactured.
<Evaluation Test 1>

For each of (i) the case where irradiation with addressing light of 500 μW/cm² is executed in a state where an arbitrary DC bias voltage is applied for 400 ms using a writing apparatus of the example 1 and the comparative example 1 and (ii) the case where light irradiation is not executed, change in the reflectivity for the applied voltage is measured with an integration spherical spectrometer (manufactured by Konica Minolta Holdings, Inc., CM2002 model). A graph of obtained voltage-normalized reflectivity is shown in FIG. 16 fort the example 1 and is shown in FIG. 17 for the comparative example 1.

Figure 16:
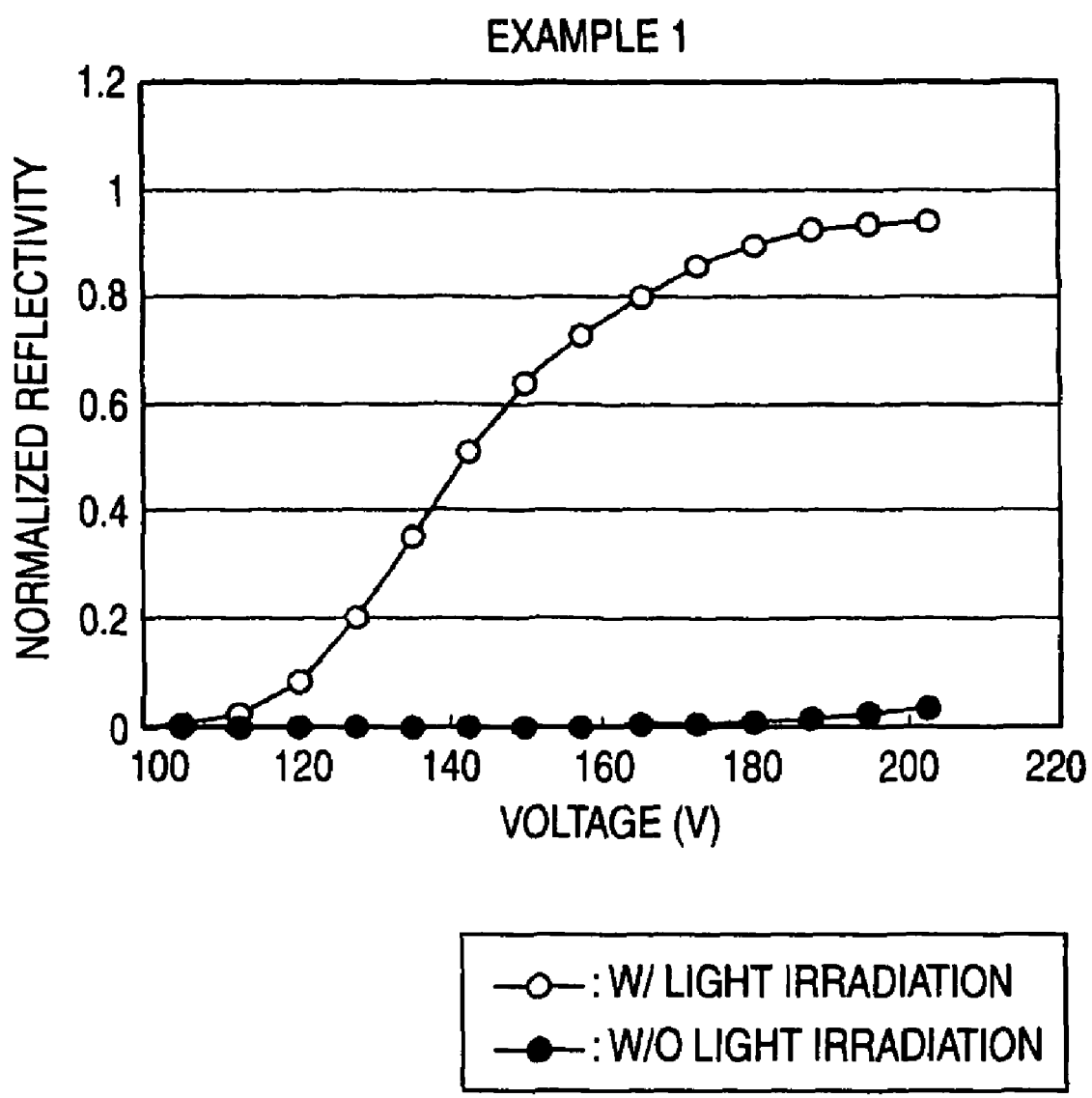
FIG. 16 is a graph to show voltage-normalized reflectivity resulting from measuring reflectivity change for applied voltage as a result of example 1 in evaluation test 1.

As shown in FIG. 16, in the example 1, when irradiation with addressing light is executed, the reflectivity increases with an increase in the bias voltage, and is saturated. On the other hand, when irradiation with addressing light is not executed, the reflectivity does not change. Thus, for example, if light image irradiation is executed in a state where a 200-V bias voltage is applied, an image having high contrast can be written to the display element 1.

Figure 17:
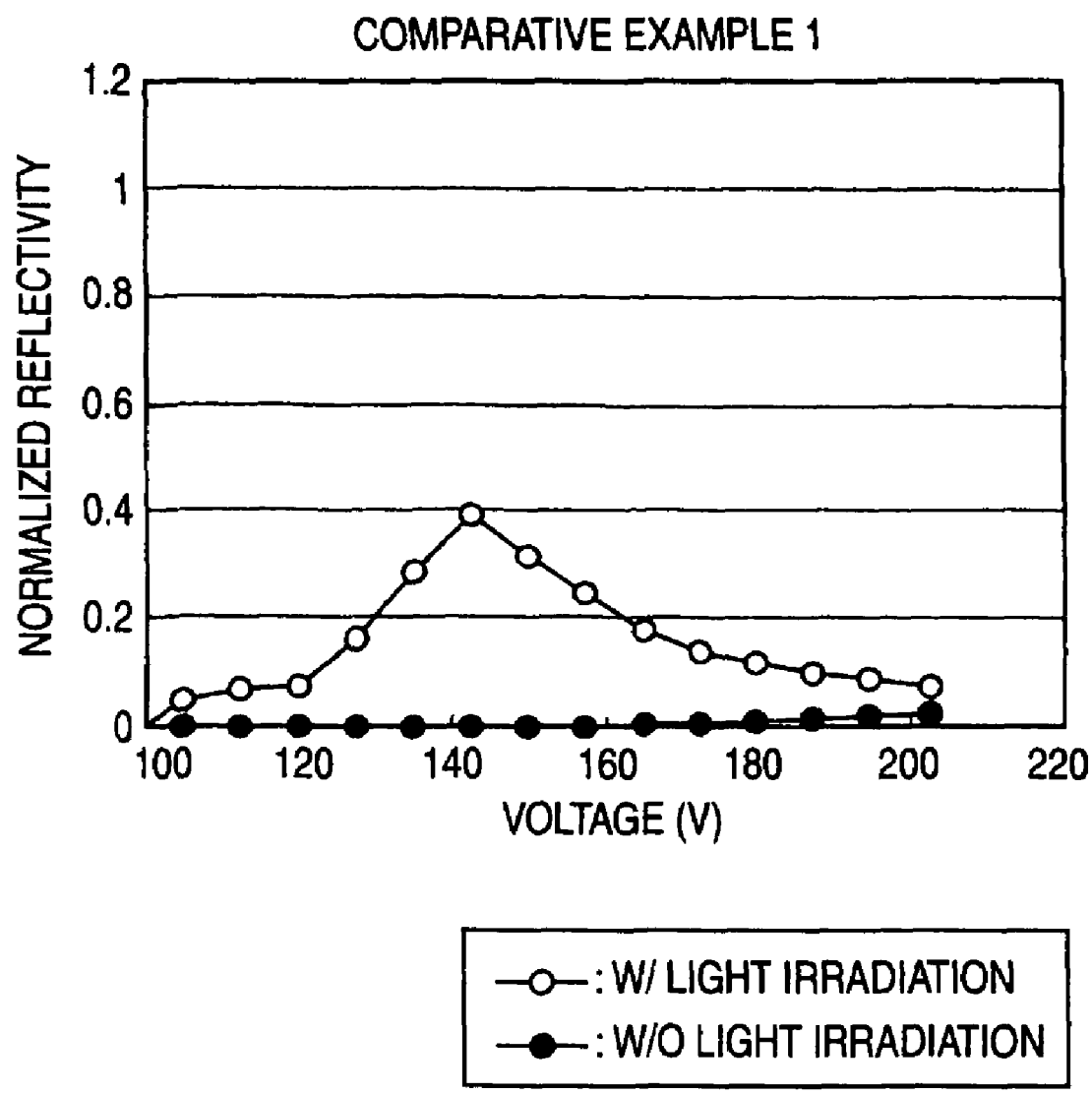
FIG. 17 is a graph to show voltage-normalized reflectivity resulting from measuring reflectivity change for applied voltage as a result of comparative example 1 in the evaluation test 1.

On the other hand, in the comparative example 1 shown in FIG. 17, when irradiation with addressing light is executed, the reflectivity starting to rise with an increase in the bias voltage and then again lowers. Thus, a sufficient reflectivity difference between the case where irradiation with addressing light is executed and the case where irradiation with light is not executed cannot be obtained. An image having high contrast cannot be written to the display element 1.
<Evaluation Test 2>

In the display element 1 in which the light modulation layer 7 and the organic photosensitive layer 10 are integrated, the voltage applied to each layer cannot directly be observed. Then, as alternative means, an organic photoconductive layer dummy and a light modulation layer dummy formed separately as the light modulation layer and the organic photosensitive layer are connected in series for manufacturing a dummy element for the purpose of waveform observation, as previously described.

An oscilloscope (Techtronix Inc., TDS1002 model) is connected in parallel with the light modulation layer dummy through a high-voltage probe (Techtronix Inc., P6015A model) and the voltage waveform applied to the light modulation layer dummy is observed.

The voltage waveform is observed for each of (i) the case where the organic photoconductive layer dummy is irradiated with addressing light of 500 μW/cm² for 20 ms for 100 ms (at the time of 0.2 s in the figure) after the voltage application start and (ii) the case where the dummy is not irradiated with light in a state in which a 100-V DC bias voltage is applied across the dummy element for waveform observation for 400 ms using the driving apparatus of the example 1 and the comparative example 1. A graph of the observed voltage waveform is shown in FIG. 18 for the example 1 and is shown in FIG. 19 for the comparative example 1.

Figure 18:
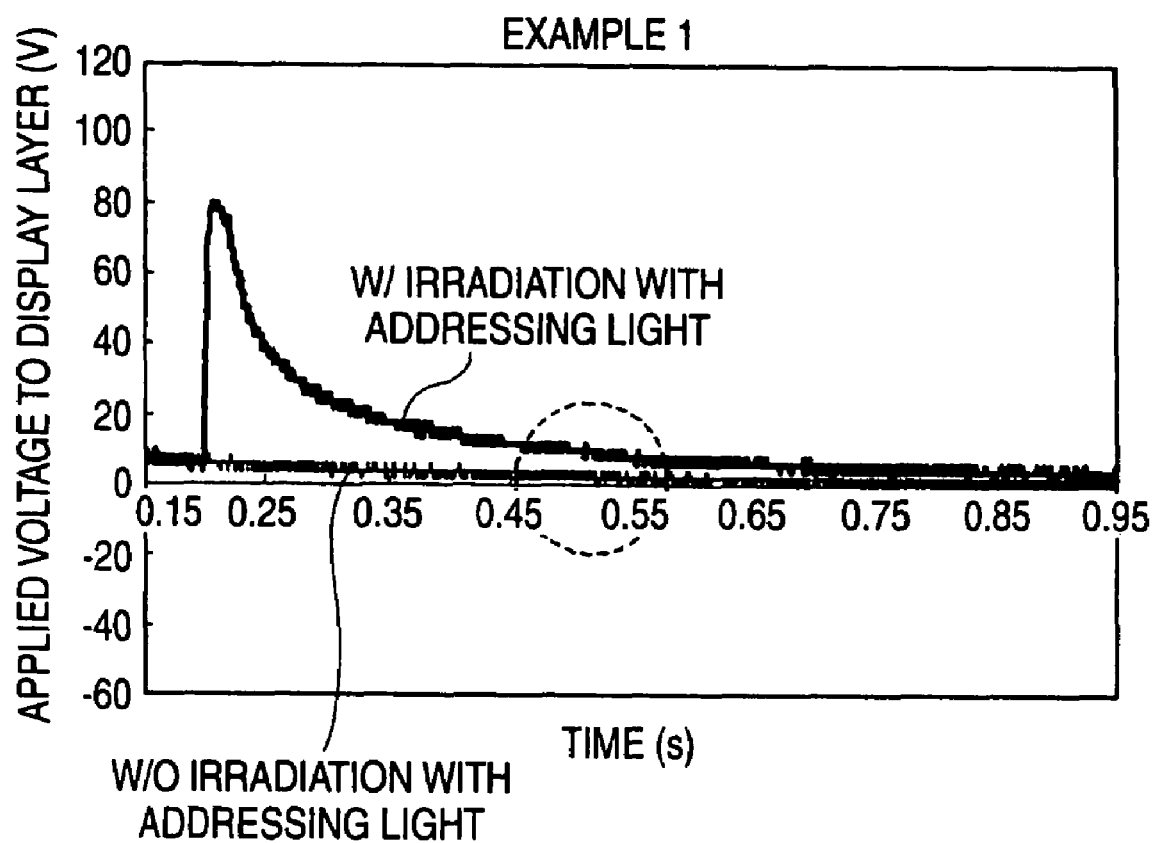
FIG. 18 is a graph to show transition of a waveform of a voltage applied to a light modulation layer at the writing time as a result of example 1 in evaluation test 2.

As shown in FIG. 18, in the example 1, the inverse potential is not observed at the end of the voltage waveform (at the time of 0.5 s on the horizontal axis in the graph of FIG. 18) and the voltage applied to the light modulation layer attenuates gently.

Figure 19:
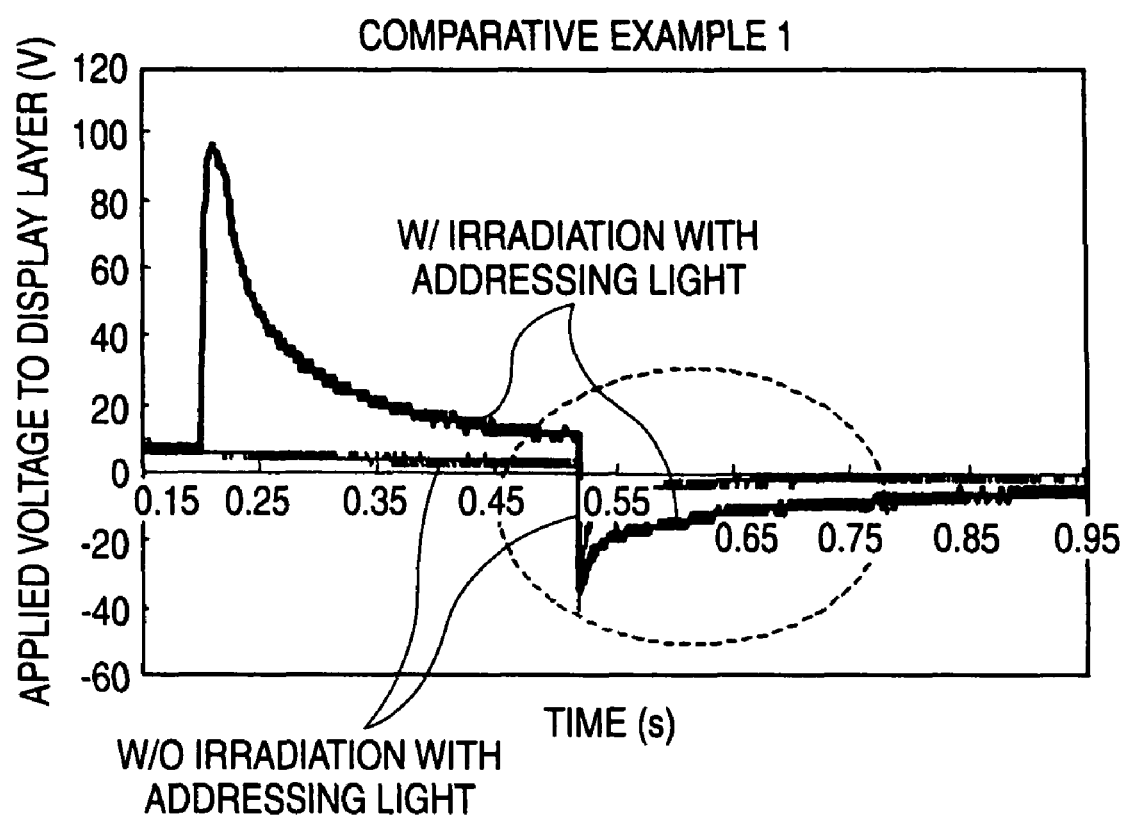
FIG. 19 is a graph to show transition of a waveform of the voltage applied to the light modulation layer at the writing time as the result of comparative example 1 in evaluation test 2.
Figure 20:
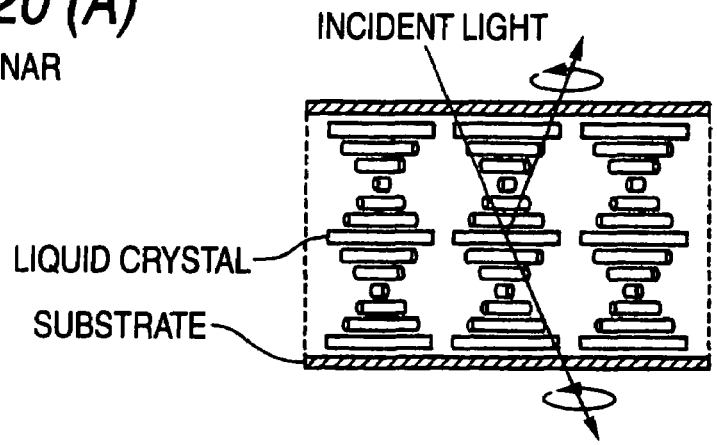
FIG. 20 is a schematic representation to show a relationship between the molecular orientation and the optical characteristic of cholesteric liquid crystal; (A) shows a relationship in planar texture; (B) shows a relationship in focal conic texture; and (C) shows a relationship in homeotropic texture.
Figure 20:
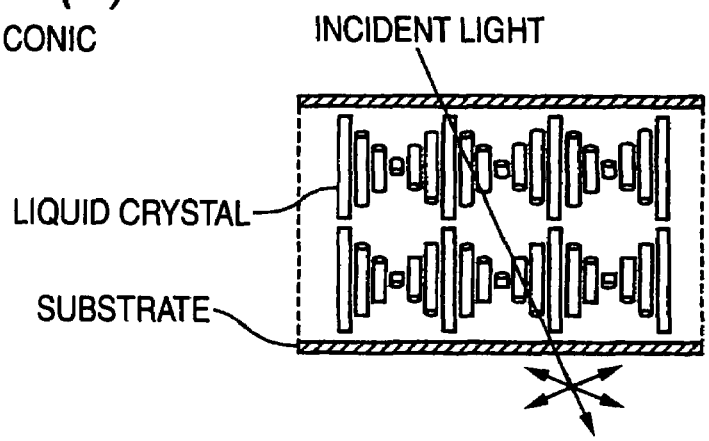
Figure 20:
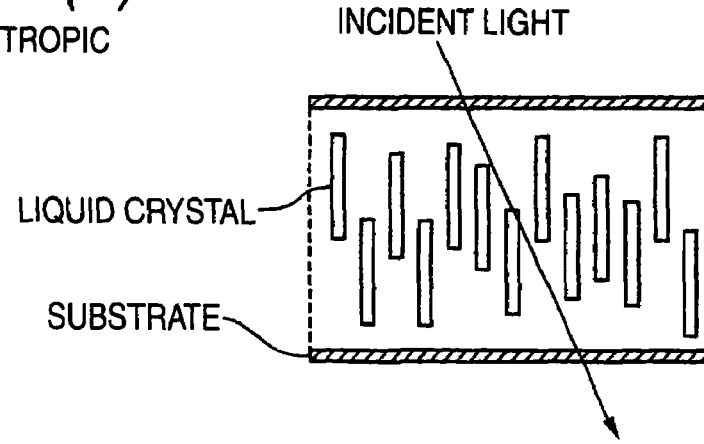

On the other hand, in the comparative example 1 shown in FIG. 19, unnecessary inverse potential is applied to the light modulation layer 7 at the end of the voltage waveform (at the time of 0.5 s on the horizontal axis in the graph of FIG. 19).

What is claimed is:

1. An photo-addressing type display apparatus comprising:
a photo-addressing type display element comprising
a pair of electrode layers, the electrode layer on a display side being transparent,
a photoconductive layer disposed between the pair of electrode layers, the photoconductive layer that absorbs light in a certain wavelength region, an electric characteristic of the photoconductive layer changing in accordance with an amount of light absorbed, and
a light modulation layer disposed between the pair of electrode layers, the light modulation layer that forms a display image which allows light to pass therethrough or reflects the light,
a voltage applying unit that forms a voltage applying circuit together with the pair of electrode layers, the voltage applying unit that applies a DC voltage between the pair of electrode layers;
a light irradiation unit that irradiates the photo-addressing type display element with addressing light from the display side or a rear side of the photo-addressing type display element; and
a resistance control unit that controls a resistance, the resistance control unit being a rectifier, wherein:
the rectifier is disposed in the voltage applying circuit in an orientation such that an electric resistance to a direction in which a current generated by the applied DC voltage flows is lower than that in an opposite direction thereto, the resistance includes a resistance to a current, which flows in a direction to reduce a potential difference between the pair of electrode layers, of a current flowing between the photo-addressing type display element and the voltage applying unit in the voltage applying circuit, and the resistance control unit controls the resistance so that the resistance when the voltage applying unit stops applying the DC voltage is larger than the resistance during a period in which the voltage applying unit applies the DC voltage between the pair of electrode layers.

2. The display apparatus according to claim 1, wherein the resistance control unit control the resistance to the current which flows between the photo-addressing type display element and the voltage applying unit in the voltage applying circuit and which flows in the direction in which the current reduces the potential difference between the pair of electrode layers to be larger than that during the period in which the voltage applying unit is applying the DC voltage, without opening the voltage applying circuit.

3. The display apparatus according to claim 1, wherein the resistance control unit comprises a variable resistor disposed in the voltage applying circuit.

* * * * *